(12) United States Patent
Shah et al.

(10) Patent No.: US 12,717,592 B2
(45) Date of Patent: Aug. 25, 2026

(54) HARDWARE LAYER-BY-LAYER PROGRAM CONTROL IN A RECONFIGURABLE DATAFLOW PROCESSOR

(71) Applicant: SambaNova Systems, Inc., Palo Alto, CA (US)

(72) Inventors: Manish K. Shah, Austin, TX (US); Denis Sokolov, Austin, TX (US); Raghu Prabhakar, San Jose, CA (US); Arjun Sabnis, San Francisco, CA (US); Joshua Earle Polzin, Palo Alto, CA (US); Arnav Goel, San Jose, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 171 days.

(21) Appl. No.: 18/824,846

(22) Filed: Sep. 4, 2024

(65) Prior Publication Data

US 2025/0077239 A1 Mar. 6, 2025

Related U.S. Application Data

(60) Provisional application No. 63/536,690, filed on Sep. 5, 2023.

(51) Int. Cl.
*G06F 9/46* (2006.01)
*G06F 9/445* (2018.01)
*G06F 9/50* (2006.01)

(52) U.S. Cl.
CPC ........ *G06F 9/44505* (2013.01); *G06F 9/5038* (2013.01); *G06F 2209/5017* (2013.01)

(58) Field of Classification Search
None
See application file for complete search history.

(56) References Cited

U.S. PATENT DOCUMENTS 6,077,315 A * 6/2000 Greenbaum ............ G06F 8/447 717/157
10,831,507 B2 * 11/2020 Shah .................. G06F 15/7867
(Continued)

FOREIGN PATENT DOCUMENTS

WO 2010142987 A1 12/2010

OTHER PUBLICATIONS

Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.
(Continued)

*Primary Examiner* — Bing Zhao
(74) *Attorney, Agent, or Firm* — FP; Sikander M. Khan

(57) ABSTRACT

A reconfigurable data processor includes a bus system, an array of configurable units, and a configuration load controller connected to the bus system and coupled to a memory. The configuration load controller incorporates a first set of registers accessible from a host processor for storing addresses of a first configuration file, a second set of registers loaded by loading a configuration file for storing addresses of a second configuration file, and an address generation unit with working address registers. The processor is configured to load a first configuration file from the memory and initiate execution based on a request from runtime software. Additional configuration files are automatically loaded upon completion of a previous configuration file based on information stored in the previous configuration file.

19 Claims, 10 Drawing Sheets

(56) References Cited

U.S. PATENT DOCUMENTS

| | | | | |
|---|---|---|---|---|
| 2009/0138567 | A1* | 5/2009 | Hoover | G06F 15/16 709/215 |
| 2015/0106596 | A1* | 4/2015 | Vorbach | G06F 9/3877 712/221 |
| 2020/0159544 | A1 | 5/2020 | Shah et al. | |
| 2020/0159692 | A1 | 5/2020 | Shah et al. | |
| 2020/0218683 | A1 | 7/2020 | Grohoski et al. | |
| 2020/0356523 | A1 | 11/2020 | Prabhakar et al. | |
| 2020/0409707 | A1* | 12/2020 | Kegel | G06F 15/7871 |
| 2021/0011770 | A1 | 1/2021 | Prabhakar et al. | |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., “Plasticine: A Reconfigurable Architecture for Parallel Patterns,” ISCA ’17, Jun. 24-28, 2017, Toronto, ON, Canada.

* cited by examiner

HARDWARE LAYER-BY-LAYER PROGRAM CONTROL IN A RECONFIGURABLE DATAFLOW PROCESSOR

REFERENCES

This application claims benefit of U.S. provisional patent application Ser. No. 63/536,690, "HARDWARE LAYER-BY-LAYER PROGRAM CONTROL IN A RECONFIGURABLE DATA PROCESSOR," filed on Sep. 5, 2023, which is hereby incorporated by reference, as if it is set forth in full in this specification.

This application is related to the following applications:

U.S. patent application Ser. No. 16/197,826, now U.S. Pat. No. 10,831,507, entitled "Configuration Load of a Reconfigurable Data Processor," filed on Nov. 21, 2018.

U.S. patent application Ser. No. 18/105,187, now U.S. Pat. No. 12,072,836, entitled "Fast Argument Load in a Reconfigurable Data Processor," filed on Feb. 2, 2023.

The related patent applications identified above are hereby incorporated by reference, as if set forth in full in this specification.

The following publications are incorporated by reference for all purposes;

Prabhakar et al., "Plasticine: A Reconfigurable Architecture for Parallel Patterns," ISCA '17, Jun. 24-28, 2017, Toronto, ON, Canada; and Koeplinger et al., "Spatial: A Language and Compiler for Application Accelerators," Proceedings of the 39th ACM SIGPLAN Conference on Programming Language Design and Implementation (PLDI), Proceedings of the 43rd International Symposium on Computer Architecture, 2018.

Each publication, patent, and/or patent application mentioned in this specification is herein incorporated by reference in its entirety to the same extent as if each individual publication and/or patent application was specifically and individually indicated to be incorporated by reference.

BACKGROUND

Technical Field

The technology disclosed relates to loading configuration information into a coarse-grained reconfigurable architecture processor from a host processor during runtime.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including field programmable gate arrays FPGAS, can be configured to implement a variety of functions more efficiently or faster than might be achieved using a general-purpose processor executing a computer program. So called coarse-grained reconfigurable architectures (e.g., CGRAs) are being developed in which the configurable units in the array are more complex than used in typical, more fine-grained FPGAs, and may enable faster or more efficient execution of various classes of functions. For example, CGRAs have been proposed that can enable implementation of energy-efficient accelerators for machine learning and artificial intelligence workloads. See Prabhakar, et al. as referenced above.

Configuration of reconfigurable processors involves compilation of a configuration description to produce a configuration file, referred to sometimes as a bitstream or bit file, and distributing the configuration file to the configurable units on the processor. To start a process, the configuration file must be loaded for that process. To change a process, the configuration file must be replaced with the new configuration file.

BRIEF DESCRIPTION OF THE DRAWINGS

The technology will be described with reference to the drawings, in which.

Figure 1:
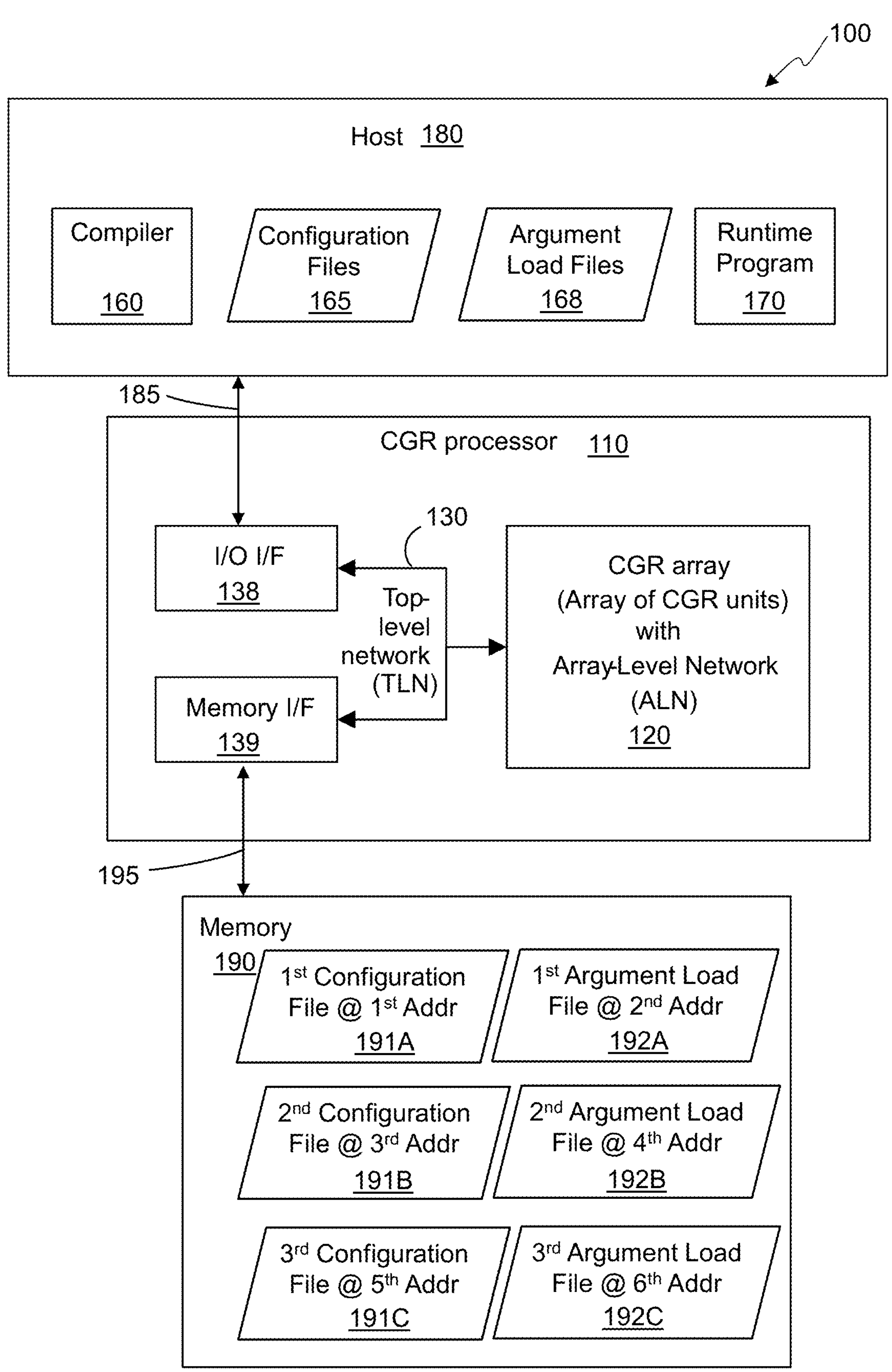
FIG. 1 illustrates an example system including a coarse-grained reconfigurable (CGR) processor, a host, and a memory.

In the figures, like reference numbers may indicate functionally similar elements. The systems and methods illustrated in the figures—and described in the Detailed Description below—may be arranged and designed in a wide variety of different implementations. Neither the figures nor the Detailed Description are intended to limit the scope as claimed. Instead, they merely represent examples of different implementations.

DETAILED DESCRIPTION

High-level programs for machine learning (ML) and artificial intelligence (AI) may require massively parallel computations, where many parallel and interdependent threads (metapipelines) exchange data. Such programs are ill-suited for execution on Von Neumann computers. They require architectures that are optimized for parallel processing, such as coarse-grained reconfigurable (CGR) architectures (CGRAs) or graphic processing units (GPUs). The ascent of ML, AI, and massively parallel architectures places new requirements on compilers, including how computation graphs, and in particular dataflow graphs, are pipelined, which operations are assigned to which compute units, how data is routed between various compute units and memory, and how synchronization is controlled particularly when a dataflow graph includes one or more nested loops, whose execution time varies dependent on the data being processed.

Many such programs can best be expressed as computation graph where nodes perform calculations and edges represent the flow of data. These types of programs can be effectively addressed using dataflow architectures, where the flow of data determines what calculations are to be done, as opposed to traditional Von Neuman architectures where programs include instructions that are fetched, decoded, and the fetch data for processing. Systems using processors having a CGRA can be well-suited for such applications. Reconfigurable dataflow processor (RDPs), reconfigurable processor, CGR processor, and CGRA processor are used interchangeable herein.

It is common now for ML/AI applications to be very large and require many nodes with trillions of parameters. Such graphs may not be able to fully fit into a single computing system at one time, even one with many reconfigurable dataflow processors. In such cases, the computation graph may be broken into sections, or layers, and a separate configuration file created for each section of the graph. If multiple reconfigurable processors are to be used for a single section of the graph, separate configuration files may be created for each reconfigurable processor for that section.

Each section of the graph can be represented by configuration files detailing the configuration of one or more RDPs. The configuration files configure one or more CFR units in each CGR processor to perform a specific operation, such as general matrix multiply (GEMM), a SoftMax, a rectified linear unit (ReLU), or some other function that may be represented by a node of a computation graph. The CGR processors then process data as it is provided to them and pass their output on to other CGR processors to perform a function of another node in the graph or to store the output into a memory buffer.

Traditionally, runtime software executing on a host computer loads the configuration file(s) for a first section of the graph into the CGR processors(s), initiates processing of the first section of the graph by the CGR processor(s), and then periodically polls the CGR processor(s) to determine when the first section of the graph is completed. The runtime software may then load the configuration file(s) for a second section of the graph into the CGR processor(s), initiate processing of the second section of the graph by the CGR processor(s), and then periodically poll the CGR processor(s) to determine when the second section of the graph is completed. This is then repeated for each section of the graph until the entire computation graph has been executed, using significant computation resources of the host processor and wasting time when the CGR processor(s) are not actually running but are waiting on the host processor.

Described herein are implementations of methods, systems, and apparatuses for sequentially loading configuration files for sections of a computation graph into a reconfigurable dataflow processor (RDP), such as a coarse-grained reconfigurable architecture (CGRA) processor. This system facilitates the automatic progression through multiple configurations necessary for executing various sections of a computation graph. By having the CGR processor handle loading of successive sections of the computation graph autonomously, it doesn't have to wait on the host processor to schedule a task to do the configuration. The CGR processor can automatically load the next configuration file once execution of the current configuration file has completed. It can do this using information included in the current configuration file.

To achieve this, configuration files for the different sections (or levels) of the computation graph are pre-loaded into a memory by a host computer. In certain implementations, an argument load file associated with each configuration file is also loaded into memory. Each configuration file, or its associated argument load file, includes information used to determine the memory addresses at least one of the configuration file and argument load file, for the subsequent section of the computation graph. While argument load files may vary in size, configuration files typically have a predetermined uniform size.

Initially, the host computer stores the address of the first configuration file and the address and size of any associated argument load file into a control/status register (CSR) of the RDP which may be mapped into the memory space of the host computer. It then initiates a configuration load process in the RDP. The configuration load circuitry within the RDP loads the first configuration file and, if included, a corresponding first argument load file, into the dataflow processing units, which may alternatively be referred to as coarse-grained configurable (CGR) units, of the RDP. Upon being configured by the first configuration file, the RDP executes the first section of the computation graph using the information in the loaded configuration file and argument load file to process data that flows into it and sends its output on to another RDP or to memory.

Once the execution of the first section is complete, the dataflow processing units signal the configuration load circuitry in the RDP. This signal may cause the configuration load circuitry (e.g. a configuration load/unload controller) to begin loading the following configuration file and/or argument load file. This process utilizes a next configuration file memory address read from an argument register in the RDP, which was previously populated using information from the first configuration file. In various implementations, the argument register may written with a value contained a portion of the configuration data store (e.g., an immediate field) in a CGR unit in the RDP, or the argument information may be calculated using information, such as a memory offset, in the configuration data store along with other information, such as a base address in a CSR. The configuration load circuitry subsequently loads the next configuration file into the RDP's dataflow processing units from the identified next configuration file memory address in memory. Similarly, the next argument load file memory address and size are read from registers previously populated using information in the currently loaded configuration file, and argument load circuitry loads the following argument load file into the RDP's dataflow processing units from the next argument load file memory address.

Upon successful loading, the RDP proceeds to execute the next section of the computation graph. This cycle of loading and executing sections continues iteratively until the final section of the computation graph completes. At that point, instead of generating a signal to load another configuration file, a flag is set to be read by the host processor.

As described in the referenced patent U.S. Pat. No. 10,831,507, a unit configuration load process is coordinated by a configuration load/unload controller in a master AGCU (MAGCU) for an array of CGR units in the RDP. The configuration load/unload controller is responsible for managing the distributed processes of loading and unloading configuration files within the CGR array of CGR units. This includes units such as switches, Pattern Compute Units (PCU), Pattern Memory Units (PMU), Fused Memory and Compute Units (FCMU), and Address Generation and Coalescing Units (AGCU). Each unit independently loads chunks of configuration data into its configuration data store. The configuration data store in a CGR unit consists of series-connected shift registers. The configuration data is received through a vector bus of an array-level network (ALN) and then serially shifted into the configuration data store. Each chunk of configuration data may be verified using unit configuration load logic before transitioning to the next chunk of configuration data.

In some cases, a configuration file is associated with an argument load file, which can update certain arguments of the configuration file without the need to completely reload an entire configuration file. It may be useful in some cases to simply load a new argument load file and commence execution of the previous configuration file, changed by the new argument load file. One mechanism to load an argument load file is described in referenced patent U.S. Pat. No. 12,072,836. Similarly to the mechanism for automatically loading the next configuration file, an argument load file associated with the next configuration file may be loaded based on information in the current configuration file.

Similarly, an unload process mirrors the load process, where configuration data are shifted from the serial chain into output FIFOs and bus system, and ultimately written back to memory as unload configuration files. These files maintain the same chunk arrangement used in the load process, ensuring fidelity during data transfer operations.

The described method utilizes linear memory address mapping to organize the configuration data for each type of configurable unit into contiguous address blocks, facilitating efficient bulk data transfer. For dense memory requests, the configuration load controller can initiate multiple memory burst requests to minimize overhead.

In summary, this reconfigurable dataflow processor system incorporates a robust method of loading and unloading configuration data through a series of coordinated commands and states, ensuring precise execution and data integrity across the entire computation graph. The described diagrams and flowcharts illustrate the operational sequences, dataflow, and control logic necessary for implementing these processes efficiently.

Terminology

As used herein, the phrase "one of" should be interpreted to mean exactly one of the listed items. For example, the phrase "one of A, B, and C" should be interpreted to mean any of: only A, only B, or only C.

As used herein, the phrases at least one of and one or more of should be interpreted to mean one or more items. For example, the phrase "at least one of A, B, or C" or the phrase "one or more of A, B, or C" should be interpreted to mean any combination of A, B, and/or C. The phrase "at least one of A, B, and C" means at least one of A and at least one of B and at least one of C.

Unless otherwise specified, the use of ordinal adjectives first, second, third, etc., to describe an object, merely refers to different instances or classes of the object and does not imply any ranking or sequence.

The terms "comprising" and "consisting" have different meanings in this patent document. An apparatus, method, or product "comprising" (or "including") certain features means that it includes those features but does not exclude the presence of other features. On the other hand, if the apparatus, method, or product "consists of" certain features, the presence of any additional features is excluded.

The term "coupled" is used in an operational sense and includes, but is not limited to, a direct or an indirect coupling. Coupled in an electronic system may refer to a configuration that allows a flow of information, signals, data, or physical quantities such as electrons between two elements coupled to or coupled with each other. In some cases, the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term "connected" is used to indicate a direct connection, such as electrical, optical, electromagnetic, or mechanical, between the things that are connected, without any intervening things or devices.

The term "configured" to perform a task or tasks is a broad recitation of structure generally meaning having circuitry that performs the task or tasks during operation. As such, the described item can be configured to perform the task even when the unit/circuit/component is not currently on or active. In general, the circuitry that forms the structure corresponding to configured to may include hardware circuits such as transistors organized to provide a function, and may further be controlled by switches, fuses, bond wires, metal masks, firmware, and/or software. Similarly, various items may be described as performing a task or tasks, for convenience in the description. Such descriptions should be interpreted as including the phrase configured to.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B". This phrase specifies that B is a factor that is used to determine A or that affects the determination of A. This phrase does not foreclose that the determination of A may also be based on some other factor, such as C. This phrase is also intended to cover an implementation in which A is determined based solely on B. The phrase based on is thus synonymous with the phrase based at least in part on.

The following terms or acronyms used herein are defined at least in part as follows:

"AGCU"—address generator (AG) and coalescing unit (CU).

"AI"—artificial intelligence.

"AIR"—arithmetic or algebraic intermediate representation.

"ALN"—array-level network.

"Buffer"—an intermediate storage of data.

"CGR"—coarse-grained reconfigurable. A property of, for example, a system, a processor, an architecture (see CGRA), an array, or a unit in an array. This property distinguishes the system, etc., from field-programmable gate arrays (FPGAs), which can implement digital circuits at the gate level and are therefore fine-grained configurable.

"CGRA"—coarse-grained reconfigurable architecture. A data processor architecture that includes one or more arrays (CGR arrays) of CGR units.

Figure 8:
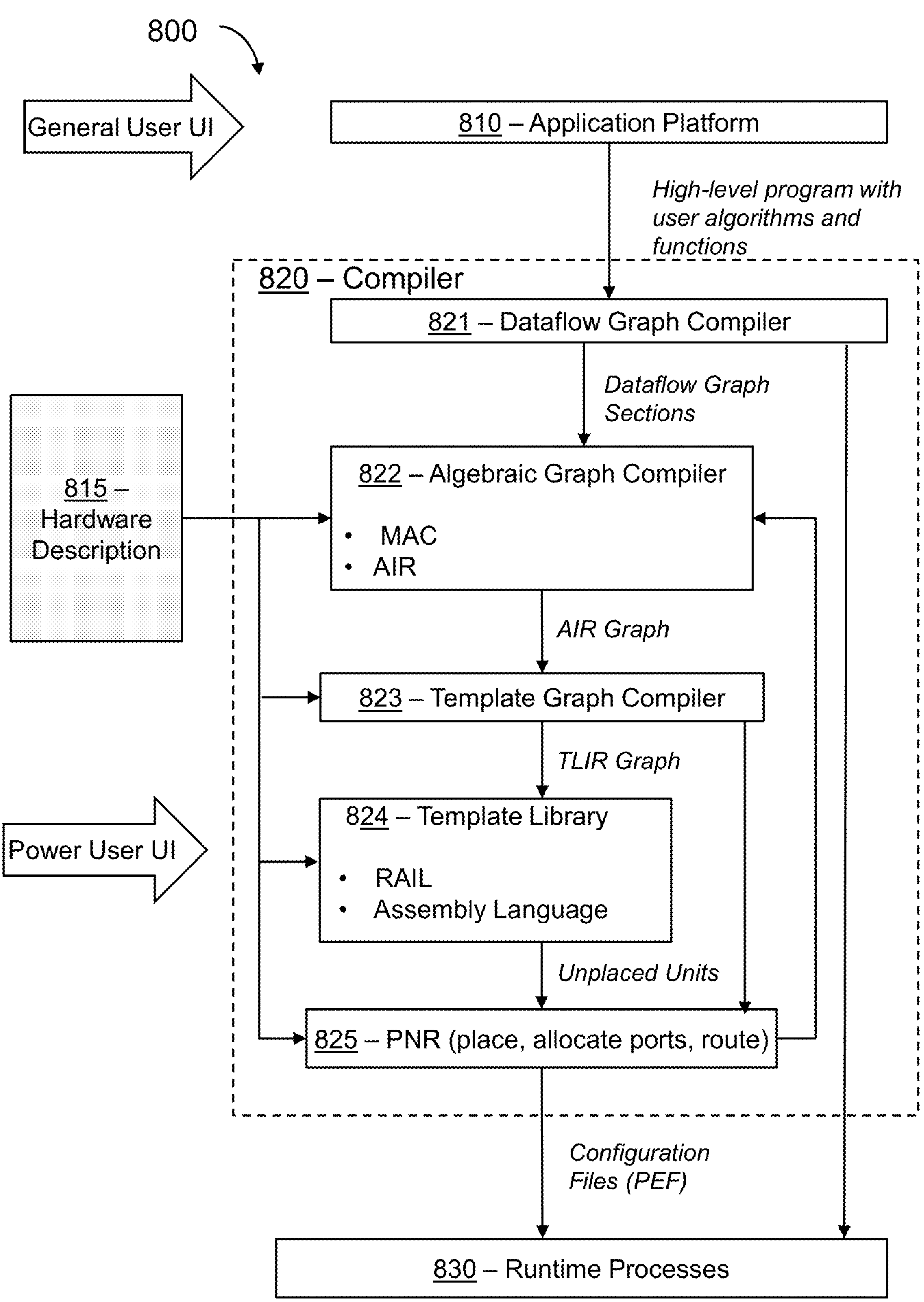
FIG. 8 is a block diagram of a compiler stack implementation suitable for generating a configuration file for a CGR processor.

"Compiler"—a translator that processes statements written in a programming language to machine language instructions or configuration information for a computer processor. A compiler may include multiple stages to operate in multiple steps. Each stage may create or update an intermediate representation (IR) of the translated statements. Example compiler stages are illustrated in FIG. 8.

"Computation graph" or "Dataflow graph"-some algorithms can be represented as computation graphs. As used herein, computation graphs are a type of directed graphs comprising nodes that represent mathematical operations/expressions and edges that indicate dependencies between the operations/expressions. For example, with machine learning (ML) algorithms, input layer nodes assign variables, output layer nodes represent algorithm outcomes, and hidden layer nodes perform operations on the variables. Edges represent data (e.g., scalars, vectors, tensors) flowing between operations. In addition to dependencies, the computation graph reveals which operations and/or expressions can be executed concurrently.

"CGR unit"—a circuit that can be configured and reconfigured to locally store data (e.g., a memory unit or a PMU), or to execute a programmable function (e.g., a compute unit or a PCU). A CGR unit includes hardwired functionality that performs a limited number of functions used in computation graphs and dataflow graphs. Further examples of CGR units include a CU and an AG, which may be combined in an AGCU. Some implementations include CGR switches, whereas other implementations may include regular switches.

"CU"-coalescing unit.

"Datapath"—a collection of functional units that perform data processing operations. The functional units may include memory, multiplexers, ALUs, SIMDs, multipliers, registers, buses, etc.

"FCMU"—fused compute and memory unit—a circuit that includes both a memory unit and a compute unit.

"IC"—integrated circuit—a monolithically integrated circuit, i.e., a single semiconductor die which may be delivered as a bare die or as a packaged circuit. For the purposes of this document, the term integrated circuit also includes packaged circuits that include multiple semiconductor dies, stacked dies, or multiple-die substrates. Such constructions are now common in the industry, produced by the same supply chains, and for the average user often indistinguishable from monolithic circuits.

"ML"—machine learning.

"PCU"—pattern compute unit—a compute unit that can be configured to repetitively perform a sequence of operations.

"PEF"—processor—executable format—a file format suitable for configuring a configurable data processor.

"PMU"—pattern memory unit—a memory unit that can locally store data according to a programmed pattern.

"PNR"—place and route—the assignment of logical CGR units and associated processing/operations to physical CGR units in an array, and the configuration of communication paths between the physical CGR units.

"CGR Array"—an array of CGR units, coupled with each other through an array-level network (ALN), and coupled with external elements via a top-level network (TLN). A CGR array can physically implement the nodes and edges of a dataflow graph.

"SIMD"—single-instruction multiple-data—an arithmetic logic unit (ALU) that simultaneously performs a single programmable operation on multiple data elements delivering multiple output results.

"TLN"—top-level network.

IMPLEMENTATIONS

The architecture, configurability and dataflow capabilities of an array of CGR units enable increased compute power that supports both parallel and pipelined computation. A CGR processor, which includes one or more CGR arrays (arrays of CGR units), can be programmed to simultaneously execute multiple independent and interdependent dataflow graphs. To enable simultaneous execution, the dataflow graphs may need to be distilled from a high-level program and translated to a configuration file for the CGR processor. A high-level program is source code written in programming languages like Spatial, Python, C++, and C, and may use computation libraries for scientific computing, ML, AI, and the like. The high-level program and referenced libraries can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and Transformer-XL.

Translation of high-level programs to executable bit files is performed by a compiler, see, for example, FIG. 8. While traditional compilers sequentially map operations to processor instructions, typically without regard to pipeline utilization and duration (a task usually handled by the hardware), an array of CGR units requires mapping operations to processor instructions in both space (for parallelism) and time (for synchronization of interdependent computation graphs or dataflow graphs). This requirement implies that a compiler for a CGRA must decide which operation of a dataflow graph is assigned to which of the CGR units, and how both data and, related to the support of dataflow graphs, control information flows among CGR units, and to and from external hosts and storage. This process, known as "place and route", is one of many new challenges posed to compilers for arrays of CGR units.

In addition, the compiler or a runtime component of the system may partition the dataflow graph into sections, or layers, for sequential operation. This may be done when the graph is too large to fit into the CGRA system that is available to execute the graph. The runtime component may load configuration files for a first section or layer into the CGRA system and then may optionally load argument load files to selectively update some locations of the configuration store which may contain arguments for the execution of that section of the graph. The runtime component may then initiate execution of the first section of the graph by the CGRA system.

Systems, circuits, and methods are disclosed herein that allow the CGRA system, or more specifically, CGR processors, to automatically load configuration files (and optionally argument load files) for subsequent sections of the graph without intervention by the runtime component running on the host processor.

FIG. 1 illustrates an example system 100 including a CGR processor 110, a host 180, and a memory 190. The system 100 may include any number of CGR processors 110, that may each have their own memory 190, coupled to the host 180. Some implementations may include multiple hosts 180. CGR processor 110 has a coarse-grained reconfigurable architecture (CGRA) and includes an array of CGR units 120 such as a CGR array. CGR processor 110 further includes an I/O interface 138, and a memory interface 139. The array of CGR units 120 is coupled with I/O interface 138 and memory interface 139 via an internal network 130 which may be part of a top-level network (TLN). Host 180 communicates with I/O interface 138 via bus 185 (e.g. a PCIe bus, Ethernet, or InfiniBand), and memory interface 139 communicates with memory 190 via memory bus 195. The array of CGR units 120 may further include compute units and memory units that are connected with an array-level network (ALN) to provide the circuitry for execution of a computation graph that may have been derived from a high-level program with user algorithms and functions. The high-level program may include a set of procedures, such as learning or inferencing in an AI or ML system. More specifically, the high-level program may include applications, graphs, application graphs, user applications, computation graphs, control flow graphs, dataflow graphs, models, deep learning applications, deep learning neural networks, programs, program images, jobs, tasks and/or any other procedures and functions that may need serial and/or parallel processing. In some implementations, execution of the graph (s) may involve using multiple units of CGR processor 110. In some implementations, CGR processor 110 may include one or more ICs. In other implementations, a single IC may span multiple CGR processors. In further implementations, CGR processor 110 may include one or more units of array of CGR units 120.

Host 180 may be, or include, a computer such as further described with reference to FIG. 2. Host 180 runs runtime processes 170, as further described herein, and may also be used to run computer programs, such as the compiler 160 further described herein with reference to FIG. 8. In some implementations, the compiler may run on a computer that is similar to the computer described with reference to FIG. 2, but separate from host 180.

CGR processor 110 may accomplish computational tasks by executing one or more configuration file 165 (for example, a PEF file) which each may include a plurality of sub-files. For the purposes of this description, a configuration file of the configuration files 165 corresponds to a portion (e.g. a section or a layer) of a dataflow graph, or a translation of a dataflow graph, and may further include initialization data. A compiler 160 compiles the high-level program to provide the configuration files 165. In this example, the configuration files 165 include a first configuration file, a second configuration file, and a third configuration file, each corresponding to a different layer of a computation graph. The compiler 160 may also include argument data in argument load files 168. The argument data specifies execution parameters for a portion of the dataflow graph. In some implementations, the arguments are specified by the users. The configuration files 165 can include initial values for arguments and the argument load files 168 can provide updated values for the arguments to be loaded after a configuration file 165 is loaded. The argument load file may, in some implementations, include a list of (value, control) tuples specifying values to be written to argument registers, with the list containing a (value, control) tuple for each argument register to be written during a single invocation of an argument load process. In this example, the argument load files 168 include a first argument load file to update arguments in the first configuration file, a second argument load file to update arguments in the second configuration file, and a third argument load file to update arguments in the third configuration file.

Runtime program 170 may copy the configuration files 165 and argument load files 168 (if used) from the memory of the host 180 to the local memory 190 of the CGR processor 110. Thus, the memory 190 may store copies of the first configuration file 191A at a first memory address, the first argument load file 192A at a second memory address, the second configuration file 191B at a third memory address, the second argument load file 192B at a fourth memory address, the third configuration file 191C at a fifth memory address, and the third argument load file 192C at a sixth memory address. The runtime program 170 can then send a configuration load command to the CGR array 120 to successively load and execute the configuration files 191A/B/C (and argument load files 192A/B/C if applicable) from the memory 190 without further involvement from the runtime program 170. In other implementations, the configuration files 165 and/or argument load files 168 may be directly accessed in the memory of the host 180 by the CGR processor 110, avoiding copying them into the local memory 190.

In some implementations described herein, a CGR array is configured by programming one or more configuration data stores with all or parts of a configuration file of the configuration files 165. A single configuration data store may be at the level of the CGR processor 110 or the CGR array 120, or a CGR unit may include an individual configuration data store. The configuration files 165 may include configuration data for the CGR array 120 and CGR units in the CGR array 120 and link the computation graph to the CGR array 120. Execution of the configuration files 165 by CGR processor 110 causes the CGR array 120 to implement the user algorithms and functions in the dataflow graph. Likewise, the argument load files 168 can provide arguments for any level and provide all or a subset of the arguments for individual CGR units.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

The example system 100 for sequentially loading configuration files into a reconfigurable dataflow processor (RDP) for executing sections of a computation graph includes a host computer 180, an RDP 110, and memory 190. The host computer 180 may be configured to pre-load a plurality of configuration files 191A-191C and associated argument load files 192A-192C for different sections of a computation graph into the memory 190. Some configuration files may have multiple associated argument load files that allow the same computation graph to be executed with different parameters or arguments but leaving the existing configuration file in place and simply loading a new argument load file. Some configuration files may not have any associated argument load files, so the arguments included in the configuration files are used during execution of the configuration file. The configuration files of the plurality of configuration files 191A-191C may have a predetermined uniform size. The argument load files of the associated argument load files 192A-192C may vary in size.

The RDP 110 includes a set of dataflow processing units 120 to execute the sections of the computation graph, a control/status register (CSR), a second register, and configuration load circuitry. The configuration load circuitry is configured to load a configuration file and/or argument load file of the plurality of configuration files 191A-191C and the associated argument load files 192A-192C from the memory 190 into the set of dataflow processing units of the RDP 110. The CLAA register (i.e. a second register) can be loaded with data as a result of receiving a token generated by execution of the configuration file, such as a token to indicate that execution of that section of the graph has completed.

The host computer 180 is further configured to store the first memory address of the first configuration file 191A, and if included, the second memory address of the associated first argument load file 192A, into the CSR and initiate a configuration load process in the RDP 110. The configuration load circuitry is further configured to load the first configuration file 191A and associated first argument load file 192A from the memory 190 into the set of dataflow processing units 120 which loads second addresses, included in the first configuration file 191A or the associated first argument load file 192A, into the CLAA register. The configuration load circuitry is also configured to initiate execution of a first section of the computation graph by the set of dataflow processing units 120 of the RDP 110 based on the first configuration file 191A and associated first argument load file 192A. The configuration load circuitry is additionally configured to, upon completion of the execution of the first section of the computation graph, load the second configuration file 191B and associated second argument load file 192A from the memory 190 into the set of dataflow processing units 120 using the second addresses stored in the CLAA register using information from the first configuration file 191A or associated first argument load file 192A, and initiate execution of a second section of the computation graph by the set of dataflow processing units of the RDP based on the second configuration file 191B and associated second argument load file 192B.

Figure 2:
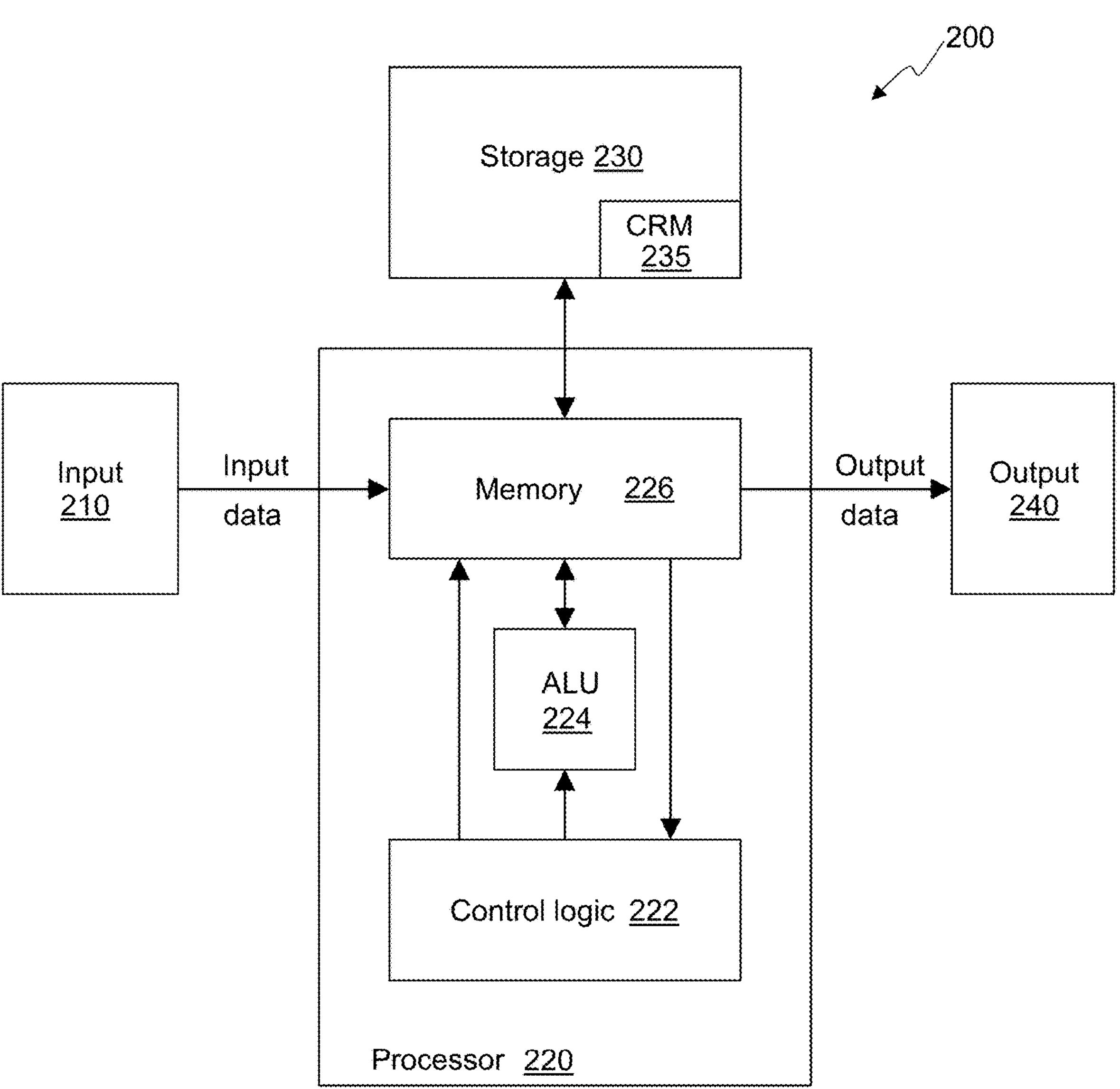
FIG. 2 illustrates an example of a computer, including an input device, a processor, a storage device, and an output device.

FIG. 2 illustrates an example of a computer 200, including an input device 210, a processor 220, a storage device 230, and an output device 240. Although the example computer 200 is drawn with a single processor, other implementations may have multiple processors. Input device 210 may comprise a mouse, a keyboard, a sensor, an input port (for example, a universal serial bus (USB) port), and any other input device known in the art. Output device 240 may comprise a monitor, printer, and any other output device known in the art. Furthermore, part or all of input device 210 and output device 240 may be combined in a network interface, such as a Peripheral Component Interconnect Express (PCIe) or Ethernet interface suitable for communicating with CGR processor 110. Input device 210 is coupled with processor 220 to provide input data, which an implementation may store in memory 226. Processor 220 is coupled with output device 240 to provide output data from memory 226 to output device 240. Processor 220 further includes control logic 222, operable to control memory 226 and arithmetic and logic unit (ALU) 224, and to receive program and configuration data from memory 226. Control logic 222 further controls exchange of data between memory 226 and storage device 230. Memory 226 typically comprises memory with fast access, such as static random-access memory (SRAM), whereas storage device 230 typically comprises memory with slow access, such as dynamic random-access memory (DRAM), flash memory, magnetic disks, optical disks, and any other memory type known in the art. At least a part of the memory in storage device 230 includes a non-transitory computer-readable medium (CRM 235), such as used for storing computer programs.

Figure 3:
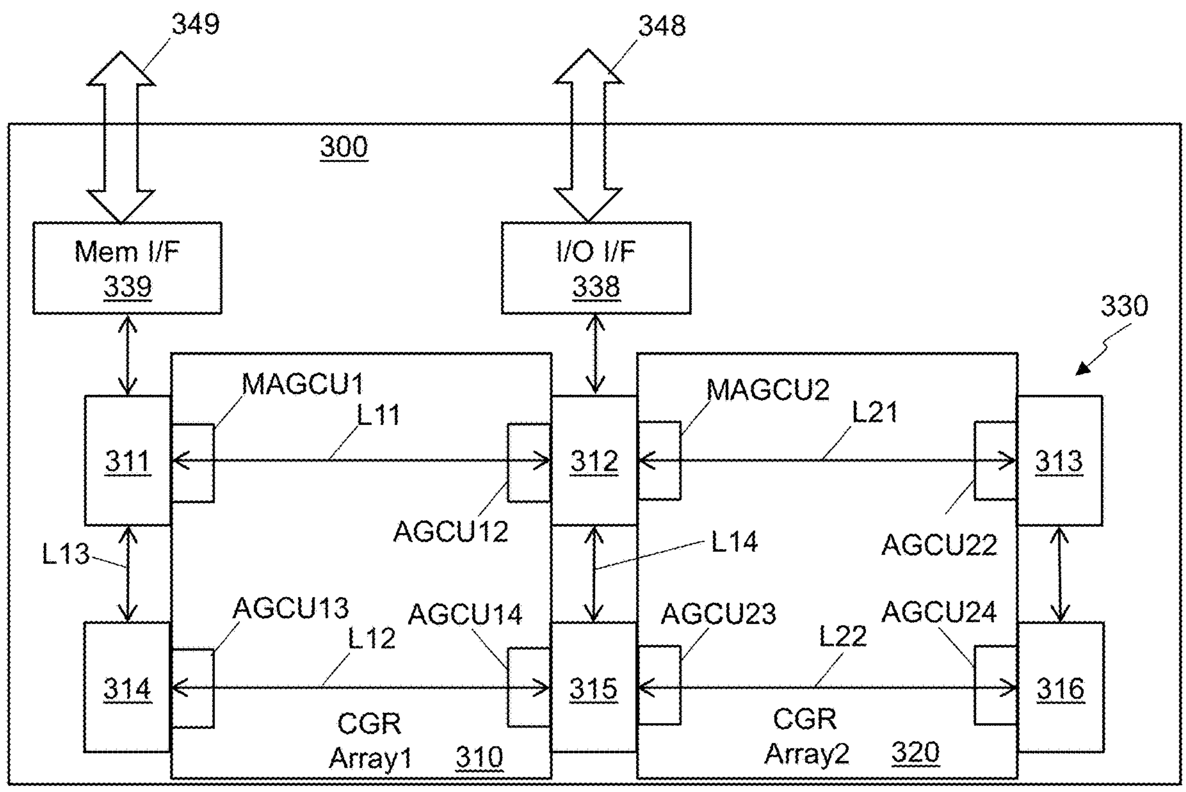
FIG. 3 illustrates example details of a CGR architecture including a top-level network (TLN) and two CGR arrays.

FIG. 3 illustrates example details of a CGR architecture 300 including a top-level network (TLN 330) and two CGR arrays (CGR array1 310 and CGR array2 320). A CGR array comprises an array of CGR units (e.g., PMUs, PCUs, FCMUs) coupled via an array-level network (ALN), e.g., a bus system. The ALN is coupled with the TLN 330 through several AGCUs, and consequently with I/O interface 338 and memory interface 339 (or any number of interfaces). Other implementations may use different bus or communication architectures.

Circuits on the TLN in this example include one or more external I/O interfaces, including I/O interface 338 to an external communication bus or network 348 and memory interface 339 to an external memory bus 349. Various implementations can include any number of external I/O interfaces to any type of external interface. The interfaces to external devices include circuits for routing data among circuits coupled with the TLN and external devices, such as high-capacity memory, host processors, other CGR processors, FPGA devices, and so on, that are coupled with the interfaces. Examples of an external communication bus or network 348 that may be included in various implementations include, but are not limited to, PCIe, Ethernet, and InfiniBand. Memory types that may be supported by various implementations using various memory busses 349 include, but are not limited to, various generations of dynamic data rate (DDR) memory (e.g., DDR4, DDR5, DDR6, etc.), or various generations of high bandwidth memory (e.g., HBM, HBM2, HBM2E, HBM3, etc.).

Each depicted CGR array has four AGCUs (e.g., MAGCU1, AGCU12, AGCU13, and AGCU14 in CGR array1 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN is constructed using top-level switches (switch 311, switch 312, switch 313, switch 314, switch 315, and switch 316) coupled with each other as well as with other circuits on the TLN, including the AGCUs, and external I/O interface 338. The TLN includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
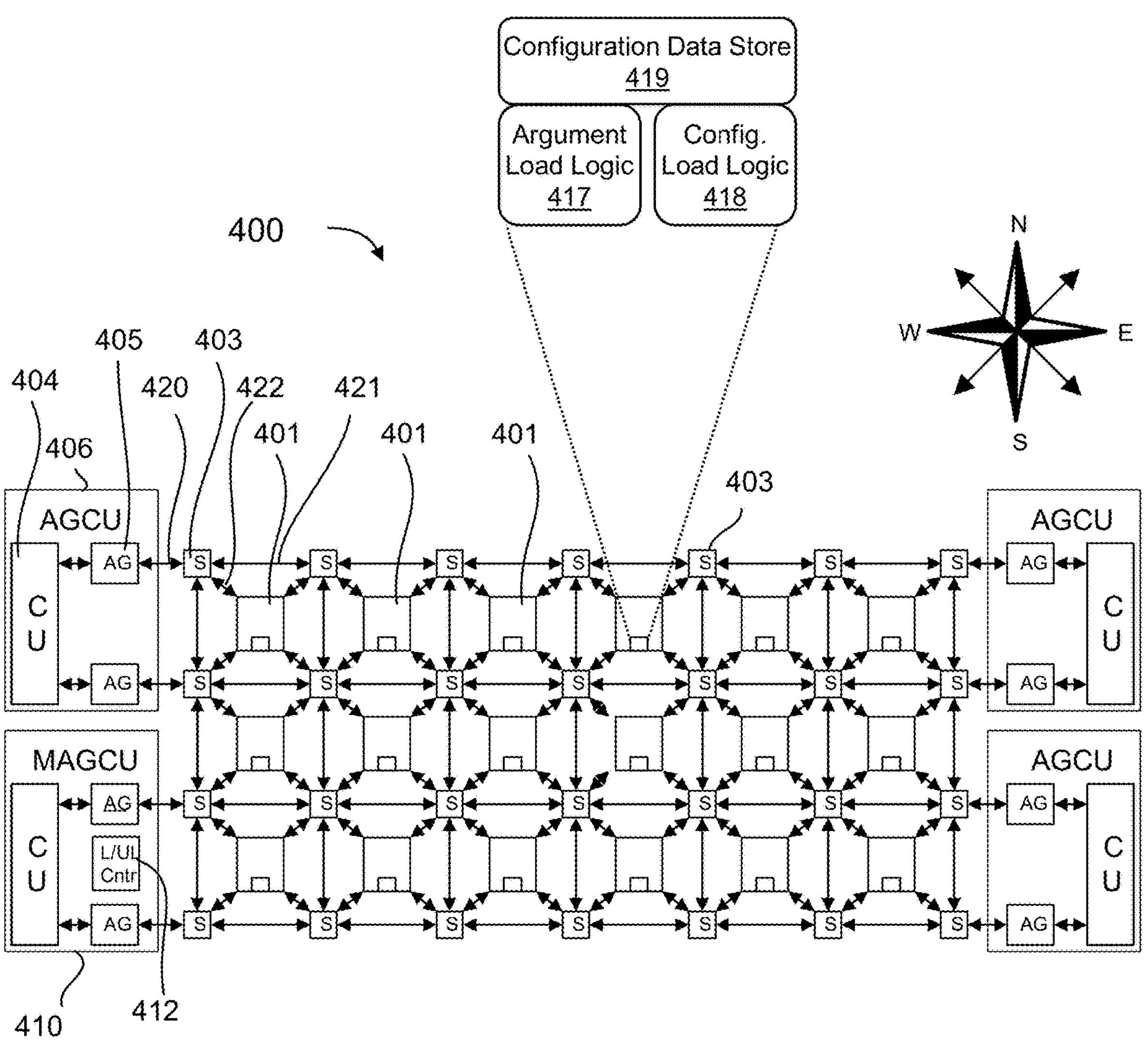
FIG. 4 illustrates an example CGR array, including an array of CGR units in an array-level network (ALN).

FIG. 4 illustrates an example CGR array 400, including an array of CGR units in an ALN. CGR array 400 may include several types of CGR unit 401, such as FCMUs, PMUs, PCUS, memory units, compute units, AGCUs, and/or switches. For examples of the functions of these types of CGR units, see Prabhakar et al., "Plasticine: A Reconfigurable Architecture for Parallel Patterns", ISCA 2017 Jun. 24-28, 2017, Toronto, ON, Canada. Each of the CGR units may include a configuration store 419 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns. The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units that execute a high-level program with user algorithms and functions. Configuration load is the process of setting up the configuration stores in the CGR array based on the configuration data to allow the CGR units to execute the high-level program. Configuration load may also require loading memory units and/or PMUs.

A configuration file includes configuration data representing an initial configuration, or starting state, of each of the CGR units 401 that execute a high-level program with user algorithms and functions. Configuration load is the process of setting up the configuration data stores in the CGR array 400 based on the configuration data to allow the CGR units 401 to execute the high-level program. Configuration load may also require loading memory units and/or PMUs. A CGR array 400 includes a load/unload controller 412 which may be included in the MAGCU 410 (i.e., an interface unit). It may also include a configuration load address (CLA) control/status register (CSR) writeable by the runtime program running on the host processor to indicate a starting physical memory address of the configuration file to be used by the load/unload controller 412, and a program control CSR with one or more configuration load bits. The load/unload controller 412 may recognize a configuration load command in response to a write to at least one of the CLA CSR or the one or more configuration load bits of the program control CSR by the runtime program running on the host processor. The load/unload controller 412 responds to the configuration load command by reading sub-files of the configuration data for CGR units 401 in the array from memory and communicating with configuration load logic 418 of the CGR units 401 to send configuration data to the configuration data store 419. This may include copying the starting physical memory address from the CLA CSR to a working register to use for generating a sequence of addresses to read the configuration file from memory. It may also include broadcasting a configuration load signal to configurable units of the array of configurable units 400 to transition the configurable units into a state of awaiting configuration sub-files, generating memory access requests to a memory starting at an address stored in the CLA CSR, receiving the sub-files of the configuration data from the memory, and distributing the sub-files of the configuration data to the configurable units (including the AGCUs 406 and MAGCU 410). The configuration load logic 418 sends sub-files from the configuration file to a particular CGR unit 401 identified for those sub-files to fully load the configuration data store 419 of that particular CGR unit 401.

The load/unload controller 412 also includes an argument load (AL) controller. An argument load address (ALA) CSR in the interface unit (e.g., MAGCU 410) is writeable by the runtime program running on the host processor to indicate a starting physical memory address of the argument load file to be used by the AL controller. An argument load size (ALS) CSR in the interface unit (e.g., MAGCU 410) is writeable by the runtime program running on the host processor to indicate a file size of the argument load file to be used by the AL controller. The interface unit may also include a program control CSR with the AL controller configured to recognize an AL command in response to a write to at least one of the ALA CSR, the ALS CSR, or one or more argument load bits of the program control CSR by the runtime program running on the host processor. After the AL controller receives an AL command from the runtime program, it reads a block of data from the argument load file stored in memory and sends arguments to the argument load logic 417 in the CGR units 401. This may include copying the starting physical memory address from the ALA CSR to a working register to use for generating a sequence of addresses to read the argument load file from memory. The ALS CSR may also be copied to a working register and used to generate the sequence of addresses to read the next argument load file from memory.

More detail of an implementation of loading and unloading configuration files can be found in U.S. Pat. No. 10,831,507 entitled "Configuration Load of a Reconfigurable Data Processor," which has been incorporated by reference into this application. More detail on loading argument load files can be found in U.S. Pat. No. 12,072,836 entitled "Fast Argument Load in a Reconfigurable Data Processor," which has also been incorporated by reference into this application.

The load/unload controller 412 also may be triggered by a token generated by execution of a configuration file in the array 400. This token may be sent over the control bus of the ALN from a CGR unit in some implementations. In some cases, the token 412 may be generated by the load/unload controller itself upon completion of an action. This may be done upon completion of execution of the configuration file currently loaded into the array 400. Upon reception of the token, the load/unload controller 412 may halt execution of the current configuration file by the array 400, if it is still running, and use an address generated from information in the current configuration file to access a next configuration file. The information from the current configuration file may be used to generate an address that is then stored in an configuration load address argument (CLAA) register. Accessing the next configuration file may be accomplished by copying the address from the CLAA register, which was loaded with an address that is based on information in the current configuration file, into a working register to use for generating a sequence of addresses to read the next configuration file from memory. An argument load address and length which were generated based on information in the current configuration file and stored in the ALAA register and the configuration load size argument (ALSA) register, may also be copied into working registers at that time. The next configuration file may then be loaded into the configuration data stores 419 of the configurable units in the array 400 similarly as done for the first configuration file. Upon completion of the load of the next configuration file, the load/unload controller 412 may be configured to load a next argument load file into the array 400. In some cases a new argument load file may be loaded without loading a new configuration file, to allow the same graph function to execute with some new arguments. Once the next configuration load file and/or argument load file are loaded, the load/unload controller 412 can initiate execution of that configuration file by the array 400.

In some implementations, an unload address may be generated based on information in the configuration file and stored into the ULAA register. If configured to do so, the load unload controller 412 can perform an unload operation of the array 400 to the unload address in the ULAA register. This may include copying the unload address from the argument of the ULAA register into a working register and used to generate a sequence of addresses to use in storing the current configuration information of the array into memory.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit, as shown in FIG. 4, may have eight interfaces. The North, South, East and West interfaces of a switch unit may be used for links between switch units using interconnects 421. The Northeast, Southeast, Northwest and Southwest interfaces of a switch unit may each be used to make a link with an FCMU, PCU or PMU instance using one of the interconnects 422. Two switch units in each CGR array quadrant have links to an AGCU using interconnects 420. The AGCU coalescing unit arbitrates between the AGs and processes memory requests. Each of the eight interfaces of a switch unit can include a vector interface, a scalar interface, and a control interface to communicate with the vector network, the scalar network, and the control network. In other implementations, a switch unit may have any number of interfaces.

During execution of a graph or subgraph in a CGR array after configuration, data can be sent via one or more switch units and one or more links between the switch units to the CGR units using the vector bus and vector interface(s) of the one or more switch units on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
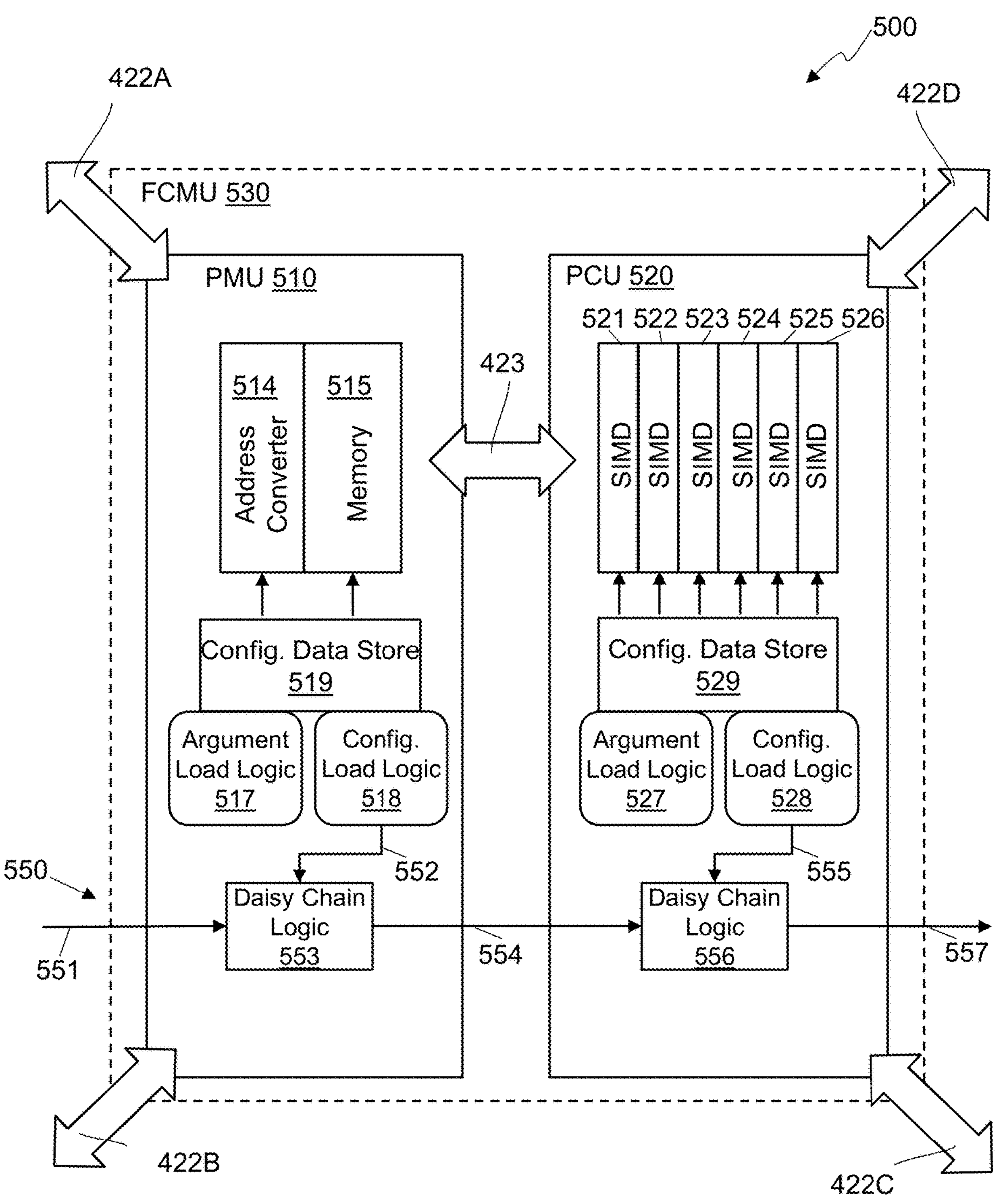
FIG. 5 illustrates an example of a pattern memory unit (PMU) and a pattern compute unit (PCU), which may be combined in a fused compute and memory unit (FCMU).

FIG. 5 illustrates an example 500 of a PMU 510 and a PCU 520, which may be combined in an FCMU 530. PMU 510 may be directly coupled to PCU 520, or optionally via one or more ALN links 423, or optionally via links through one or more switches. The FCMU 530 may include multiple ALN links, such as northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

The links 422, 423 are a part of a bus system (also referred to as the array level network-ALN) that includes three physical networks:

- a packet-switched vector network that transfers vector packets each having a multi-word-sized vector payload and a header that includes a destination, a sequence ID, and a virtual channel (flow control class).
- a packet-switched scalar network that transfers scalar packets each having a word-sized payload and a header that includes information such as a destination and a type.
- a circuit-switched control network that uses wires that are pulsed to transmit a control token.

The vector network can carry configuration data from and/or argument data from the load/unload controller to the configurable units in the array of configurable units, and the scalar network can carry response packets from the configurable units in the array of configurable units to the load/unload controller.

PMU 510 may include an address converter 514, a scratchpad memory 515, and a configuration store 519. Configuration store 519 can configure address converter 514 to generate or convert address information for scratchpad memory 515 based on data received through one or more of the ALN links 422A-B, and/or 423. The configuration data also includes arguments that are used by a portion of the dataflow graph running on the PMU 510 and/or are used to manage the execution of the dataflow graph. The PMU 510, like other CGR units in the CGR array of the CGR processor, includes configuration load logic 518 and argument load logic 517 that can store data into the configuration data store 519. The configuration load logic 518 can provide a "done" signal 552 to the daisy chain logic 553 upon completion of loading the configuration data store 519. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes two or more processor stages, such as SIMD 521 through SIMD 526, and configuration store 529. The processor stages may include ALUs, or SIMDs, as drawn, or any other reconfigurable stages that can process data. PCU 520 may receive data through ALN links 422C-D, and/or 423, and process the data in the two or more processor stages or store the data in configuration store 529. PCU 520 may produce data in the two or more processor stages, and transmit the produced data through one or more of the ALN links 422C-D, and/or 423. If the two or more processor stages include SIMDs, then the SIMDs may have a number of lanes of processing equal to the number of lanes of data provided by a vector interconnect of ALN links 422C-D, and/or 423. The output of the processor stages 521-526 can be sent out of the PCU 520 through one or more links 422 of the ALN. The PCU 520 includes a configuration data store 529 to hold configuration data to configure the processor stages 521-526. The configuration data also includes arguments that are used by a portion of the dataflow graph running on the PCU 520 and/or are used to manage the execution of the dataflow graph. The PCU 520 includes configuration load logic 528 and argument load logic 527 that can store data into the configuration data store 529. The configuration load logic 528 can provide a "done" signal 555 to the daisy chain logic 556 upon completion of loading the configuration data store 529.

The daisy chain 550 of the CGR array provides an interconnect topology, separate from and in addition to, the bus system of the CGR array (i.e. the ALN), that connects to the configurable units (i.e. the CGR units) in the array of configurable units. This interconnect topology includes the daisy chain 550 which can be used by the configurable units in the array to indicate completion of at least a portion of loading the configuration data or loading the received argument data into their respective configuration data store. In some implementations the argument load logic 517, 527 may also provide a done signal to its respective daisy-chain logic 553, 556. The daisy chain 550 connects the configurable units in an array of configurable units together with the output of one unit feeding into the input of a next unit. For example, the first daisy chain signal 551 comes from another configurable unit (not shown) and drives an input of the daisy chain logic 553. The daisy chain logic 553 will keep its output 554 inactive until both its input 551 and the done signal from the configuration load logic 518 are active, but once that is true, it will drive its output 554 active. The daisy chain logic 553 may include a clocked flip-flop to make the daisy chain 550 into a clocked pipeline. The output 554 of the daisy chain logic 553 leaves the PMU 510 and enters the PCU 520 where it becomes the input of daisy chain logic 556. Daisy chain logic 556 holds its output 557 inactive until both its input 554 and done signal 555 are active. The output 557 leaves the PCU 520 and goes to another configurable unit. In some implementations, all of the configurable units in an array are connected into the daisy chain 550. The daisy chain 550 may begin and end at a load/unload controller in the MAGCU for the array.

Figure 6:
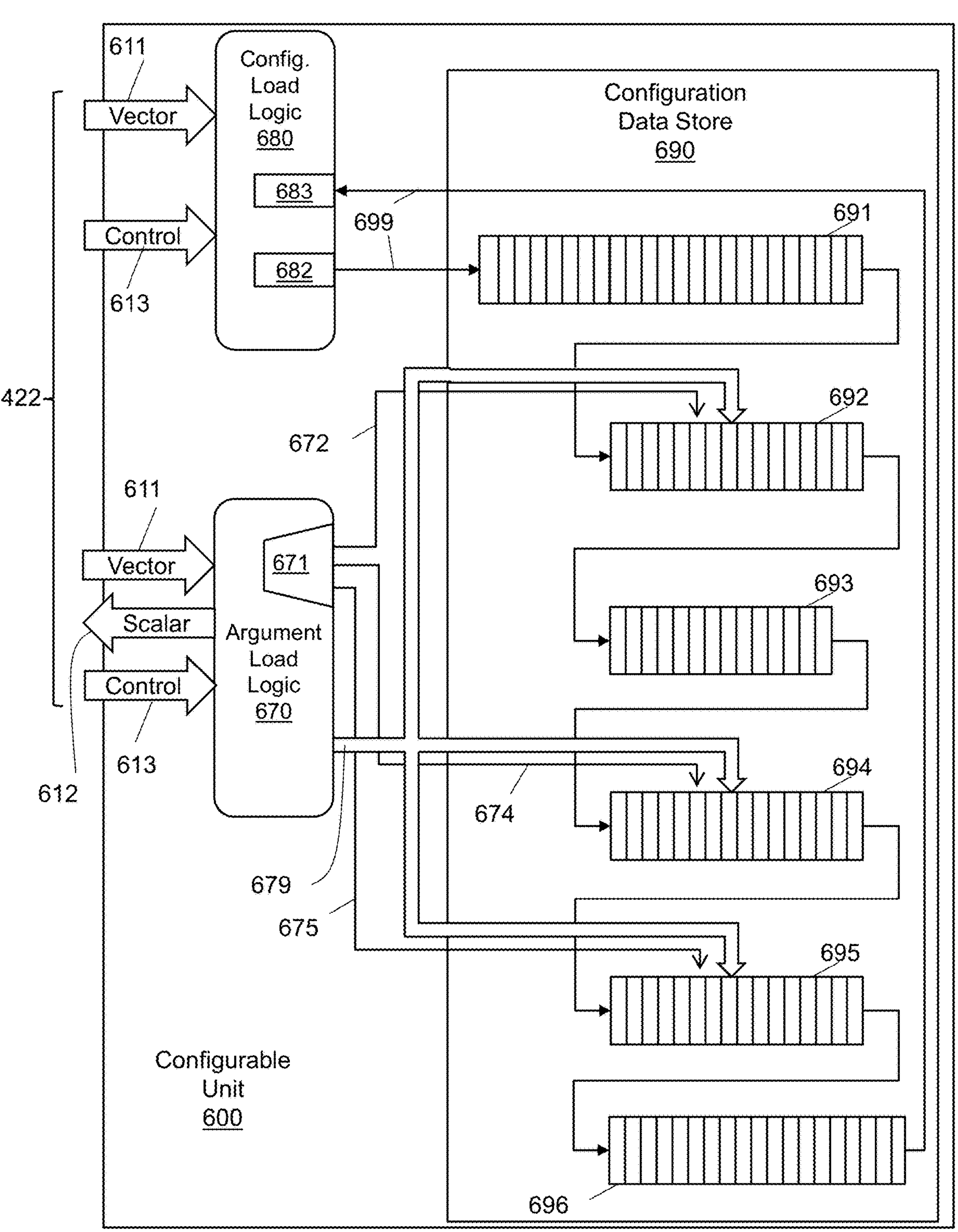
FIG. 6 illustrates an example of a configuration data store organized as a shift register with configuration load logic to shift configuration data into the shift register of the configuration data store and argument load logic to directly load data into argument registers within the shift register.

FIG. 6 illustrates an example of a configuration data store 690 of a configurable unit 600 in an array of configurable units in a reconfigurable processor organized as a shift register to store configuration data. Other implementations may load the configuration data store of configurable units using different techniques. The configuration data store 690 of this example also includes individually addressable argument registers 692, 694, 695 respectively including word-sized portions of the shift register adapted to provide arguments to the configurable unit 600. In some implementations, the argument register 692 may be information used to calculate an address to store into a configuration load address argument (CLAA) register, the argument register 694 may be information used to calculate an address to store into an argument load address argument (ALAA) register, and the argument register 695 may be information used to calculate a value to store into an argument load size argument (ALSA) register. In some cases, the argument registers 692, 694, 695 may be immediate values that are simply copied into the CLAA register, the ALAA register, and the ALSA register, respectively. The configuration data store 690 may also include information that is used to calculate an address to store into an unload address argument (ULAA) register. In various implementations, the information used to calculate new values for the CLAA, the ALAA, ALSA, and/or ULAA may writeable as an argument in an argument load operation, or may only be writeable as a part of a full configuration load operation.

The configurable unit 600 includes configuration load logic 680 to receive sub-files of the configuration data via links 422 of the bus system (e.g., the ALN) and to load the received sub-files into the configuration data store 690, including the argument registers, by sequentially shifting the received sub-files into the shift register. The configurable unit 600 also includes argument load logic 670 to receive argument data via links 422 of the bus system and load the received argument data into the argument registers 692, 694, 695 without shifting the received argument data through the shift register. Note that the shift register may include configuration bits 691, 693, 696 that are not defined as argument registers or accessible through the argument load process.

A configuration load controller associated with the array (such as the configuration load controller in the load/unload controller 412 in the MAGCU 410 shown in FIG. 4) responds to a configuration load command by executing a configuration load process. This may include sending a first signal to the configuration load logic 680 of the configurable unit 600 over the control network 613, and subsequently distributing a configuration file that has sub-files of configuration data to the configurable unit 600 in the array as specified in the configuration file. The sub-files may be sent to the configuration load logic 680 over the vector network one sub-file at a time. The configuration load logic 680 loads the received sub-file into an input register 682 and then shifts the data of the input register 682 into the shift register of the configuration data store 690 through the shift chain 699. As the input register 682 is shifted into the first section 691 of the shift register, the data from the first section 691 shifts into the first argument register 692 (which is also the second section of the shift register), the data from the first argument register 692 shifts into the third section of the shift register 693, the data from the third section of the shift register 693 shifts into the second argument register 694 (which is also the fourth section of the shift register), the data from the second argument register 694 shifts into the third argument register 695 (which is also the fifth section of the shift register), the data from the third argument register 695 shifts into the sixth section of the shift register, and the data from the sixth section of the shift register shifts into the output register 683 of the configuration load logic 680. As each new sub-file is received, the process of shifting it from the input register 682 into the shift register is repeated. Note that to update even a single bit of the configuration data store using the configuration load process, the entire contents of the configuration data store 690 need to be shifted into the shift register of the configuration data store 690. Note that depending on the implementation, the width of the shift chain 699 can be any number of bits, including, but not limited to, 1 bit wide (a true serial shift register), 2 bits wide, and 4 bits wide. Thus, the shift register can include a multi-bit wide shift chain 699 that includes the individually addressable argument registers 692, 694, 695.

An argument load (AL) controller associated with the array (such as the AL controller in the load/unload controller 412 in the MAGCU 410 shown in FIG. 4) responds to an AL command by executing an AL process. This may include sending a second signal to the argument load logic 670 of the configurable unit 600 over the control network 613, and subsequently distributing (value, control) tuples to the configurable unit 600 over the vector network 611 as specified in an argument load file. The (value, control) tuple may be sent to the configurable unit 600 over a vector network 611 of the bus system using dimension order routing. The argument load logic 670 uses a register ID part of the control portion of the (value, control) tuple to determine which argument register 692, 694, 695 to access. In the example provided, the register ID can be provided to the demultiplexer 671 to drive the appropriate write enable signal 672, 674, 675 while the value portion of the (value, control) tuple is provided on the argument data bus 679. So, if the register ID is 1 (Note: when counting IDs in this example, the counting starts at 1), argument register write enable1 672 is asserted to directly write the value portion of the (value, control) tuple into the first argument register 692 in parallel without shifting the value portion through the shift register. That is to say that a new value is stored in the first argument register 692 without changing the data in another part of the shift register, such as the first section 691 of the shift register immediately preceding the first argument register 692 or the third section 693 of the shift register immediately following the first argument register 692. Similarly if the register ID is 2, argument register write enable2 674 is asserted to directly write the value portion of the (value, control) tuple into the second argument register 694 in parallel without shifting the value portion through the shift register, and if the register ID is 3, argument register write enable3 675 is asserted to directly write the value portion of the (value, control) tuple into the third argument register 695 in parallel without shifting the value portion through the shift register. Once the (value, control) tuple has been processed by writing the value portion to the argument register specified by the control portion, the argument load logic 670 sends a response packet with its control bit set over the scalar network 612 to the FAL controller to indicate that a (value, control) tuple has been processed. Thus, the configurable unit 600 is configured to provide multiple access modes to an argument register of the individually addressable argument registers 692, 694, 695. The multiple access modes may include a first access mode of sequentially shifting argument data into the argument register via the multi-bit wide shift chain 699, and a second access mode of accessing the argument register directly without changing data loaded into other parts of the shift register.

Figure 7:
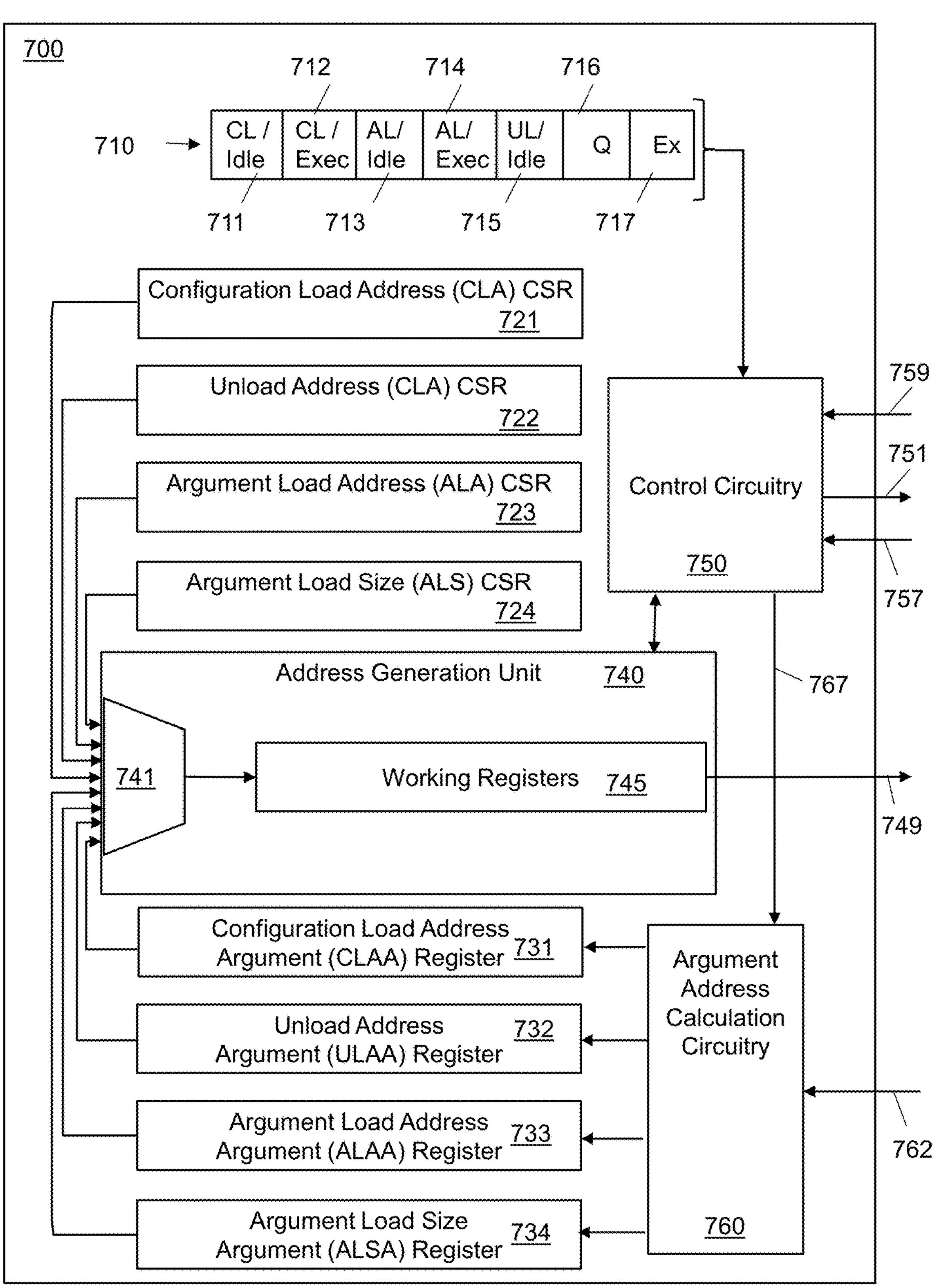
FIG. 7 illustrates certain aspects of an example configuration load/unload controller for an array of CGR units.

FIG. 7 illustrates certain aspects of an example load/unload controller 700 for an array of CGR units, which may be used for the load/unload controller 412 in the MAGCU 410 shown in FIG. 4. The load/unload controller 700 includes, or at least has access to values stored in, several control/status registers (CSRs) 721-724 that are accessible (e.g., mapped into the memory space of) to a host processor through an external interface as well as several argument registers 731-734 which may not be directly accessible to (e.g., not mapped into the memory space of) the host processor. The CSRs include a program control CSR 710, a configuration load address CSR 721 (i.e., a CLA register), an unload address CSR 722 (i.e., a ULA register), an argument load address CSR 723 (i.e., an ALA register), and an argument load size CSR 724 (i.e., an ALS register).

The program control CSR 710 can have any number of bits with any function, depending on the implementation. The example program control CSR 710 includes several example bits 711-717. Implementations may include any number or combination of the bits shown and/or may include additional bits.

The example program control CSR 710 includes two bits related to the configuration load function. A Configuration load and Return to Idle (CL/Idle) bit 711, when set, can cause the load/unload controller 700 to execute a configuration load process and once the configuration load process is complete, the configurable units return to an idle state. A Configuration load and Execute (CL/Exec) bit 712, when set, can cause the load/unload controller 700 to execute a configuration load process and once the configuration load process is complete, have the configurable units begin execution.

The example program control CSR 710 also includes two bits related to an argument load (AL) function. An AL/Idle bit 713, when set, can cause the load/unload controller 700 to execute an AL process and once the AL process is complete, the configurable units return to an idle state. An AL/Exec bit 714, when set, can cause the load/unload controller 700 to execute an AL process and once the AL process is complete, the configurable units begin execution. The AL process may be argument load function described herein, the fast argument load function or alternative load function described in U.S. Pat. No. 12,072,836, or any other argument load function, depending on the implementation.

The example program control CSR 710 also includes a bit related to an unload (UL) function. An UL/Idle bit 715 can cause the load/unload controller 700 to execute an UL process and once the UL process is complete, the configurable units return to an idle state. Also included in the example program control CSR 710 are a quiesce (Q) bit 716 and an execute (Ex) bit 717 which can be respectively used to cause the configurable units to enter the quiesce state and to begin execution of the currently loaded configuration file, entering the execute state.

The load/unload controller 700 includes control circuitry 750 which performs a process as indicated by selected bits of which are written by the runtime program running on the host processor to trigger execution of a process selected from among multiple processes, the multiple processes including the configuration load process, the argument load process, and the unload process. The control circuitry 750, after completion of the selected process, may clear a bit of the program control CSR 710 that had been set by the runtime program running on the host processor to trigger execution of the selected process. In other implementations, additional bits may be included in the program control CSR 710 (or another CSR) to give status of the array of configurable units and any operation that has been previously commanded. Thus, the load/unload controller 700 may, upon completion of the AL process, clear an AL process bit 713, 714 of the program control CSR 710 that had been written to trigger execution of the AL process. Similarly, the load/unload controller 700 may, upon completion of the configuration load process, clear a configuration load bit 711, 712 of the program control CSR 710 that had been written to trigger execution of the configuration load process. In addition, the load/unload controller 700 may, upon completion of the unload process, clear a UL bit 715 of the program control CSR 710 that had been written to trigger execution of the unload process.

In response to the host runtime process initiating a CL, AL, or UL by setting a bit in the program control CSR 710, the control circuitry 750 copies the appropriate CSR(s) to working registers 745 in an address generation unit 740. The address generation unit 740 may be a general-purpose address generation unit useable for TLN transactions or may be a dedicated address generation unit for the load/unload controller, 700 depending on the implementation. The control circuitry 750 may control a mux 741 to select the configuration load address CSR 721 to be copied to a working register 745 for a configuration load operation. The control circuitry 750 may control the mux 741 to select the unload address CSR 722 to be copied to a working register 745 for an unload operation. The control circuitry 750 may control the mux 741 to select the argument load address CSR 723 and argument load size CSR 724 to be copied to working registers 745 for an argument load operation.

The control circuitry 750 then has the address generation unit 740 generate a sequence of one or more addresses 749 based on the address and size (the size being a predetermined constant for the configuration load and unload based on the array of configurable units) copied into the working registers 745. The sequence of one or more addresses 749 is used to access the memory to read the configuration file or argument load file, or to write the unload file. In some implementations, the control circuitry 750 may utilize a general-purpose address generation unit (such as AG 405 shown in FIG. 4) to generate the sequence of one or more addresses 749, but in other implementations, a dedicated address generation unit 740 may be used.

The sequence of one or more addresses 749 may be provided to a TLN interface within the MAGCU to be routed to a memory controller in the CGR processor to access the memory. In some implementations, the TLN may be used to access memory controlled by a different CGR processor or even to access host memory. Thus, a host runtime process may unload configuration information from an array of CGR units into a file stored at an address in the unload address CSR 722 by setting a bit, such as an UL/Idle bit 715, in the program control CSR 710. A host runtime may load an array of CGR units with a configuration file stored at an address in the configuration load address CSR 721 by setting a bit, such as the CL/Idle bit 711 or the CL/Exec bit 712, in the program control CSR 710. The configuration file for the load and unload commands may have a predetermined uniform size, or implementations may include a size register for use with the load and unload commands. A host runtime may update arguments in an array of CGR units with an argument load file stored at an address in the argument load address CSR 723 having a size indicated by the argument load size CSR 724 by setting a bit, such as the AL/Idle bit 713 or the AL/Exec bit 714, in the program control CSR 710. In some implementations, the argument load file may be of a predetermined size obviating the need for the argument load size CSR 724.

During a CL, a daisy chain 550 as shown in FIG. 5 may be used to determine when the configuration load process has completed. The control circuitry 750 includes a daisy chain output 751 which acts as the initial input into the daisy chain 550 and a daisy chain input 757 which receives a final output of the daisy chain 550. Once the control circuitry 750 has provided the entire configuration file to its array of configurable units of a CL process, the control circuitry 750 asserts its daisy chain output 751. Once each of the configurable units in the array have completed their configuration load, they allow the daisy chain output to pass through, so once the control circuitry 750 sees that its daisy chain input 757 is asserted, it knows that all of the configurable units have completed loading their configuration store. The daisy chain 550 may be used by an AL or UL process in some implementations or other mechanisms to determine when the AL or UL command has completed may be used.

The control circuitry 750 can receive a token 759 from a CGR unit in the array of CGR units to which the MAGCU containing the load/unload controller 700 is associated. The token 759 may be received through the control bus of the ALN for the array of CGR units in some implementations, but other implementations may pass a token from a CGR unit to the load/unload controller 700 using any appropriate technique, including sending a packet over a packet switching bus, a dedicated signal line, or setting a flag in the load/unload controller 700. The MAGCU may generate a token based on completion of a task, such as an unload operation, a configuration load operation, or an argument load operation, which may then be used to trigger another task.

In response to receiving the token 759, the load/unload controller 700 may determine whether or not to perform a load, unload, and/or argument load command using information stored in argument registers 731-734. Some implementations may use different tokens to indicate which command(s) to execute. Which token to use to trigger a specific task may be determined by the currently loaded configuration file.

Other implementations may utilize other techniques to determine which command(s) to perform, such as the values stored in the argument registers 731-734 or flags in another argument register (not shown). For example, a value of all 1s in an argument register may be used to indicate that the associated command should not be executed and the commands for those registers which have a value that is not all 1s is to be executed in a predetermined order, such as unload if the ULAA register is not all 1s, followed by load if the CLAA register is not all 1s, followed by argument load if the ALAA register is not all 1s.

The load/unload controller 700 may include, or at least have access to, a configuration load address argument (CLAA) register 731, an unload address argument (ULAA) register 732, an argument load address argument (ALAA) register 733, and an argument load size argument (ALSA) register 734. The argument registers 731-734 might not be mapped into the memory space of the host processor and might not be directly accessible to the host processor. The argument registers 731-734 are loaded based on information 762 from the currently loaded configuration file and/or argument file. One or more of the argument registers may be loaded in response to receiving a specific token, such as a token generated by a CGR unit to indicate completion of execution of the currently loaded section of a graph. Other implementations may choose other tokens or triggers to cause values to be generated based on the information 762 in the configuration file to load into one or more of the argument registers 731-734.

Argument address calculation circuitry 760 may be used to generate values to load into the argument registers 731-734 based on the information 762 in the configuration file and/or argument load file. The argument address calculation circuitry 760 may be a general-purpose address generation unit useable for TLN transactions or may be a dedicated address generation unit for the load/unload controller, 700 depending on the implementation. The argument address calculation circuitry 760 may be controlled 767 by the control circuitry 750 based on the token 759 that is received. The values loaded into the one or more argument registers 731-734 may be directly loaded from specific bits in the configuration data store (i.e., the information 762) that are populated as a part of loading a configuration file and/or an argument load file into the CGR array. In some implementations, the values loaded into the one or more argument registers 731-734 are calculated using the information 762 from the configuration file and, in some implementations, other information from CSRs or other memory within the CGR processor. In some implementations, the information 762 be included in the configuration data store of the MAGCU which includes the load/unload controller 700 but implementations may include the information 762 in any CGR unit of the CGR array associated with the load/unload controller 700. Thus, the argument registers 731-734 contain data from the current configuration file and/or argument load file.

Upon receipt of the token 759, which may be a first token, such as a completion of execution token from a CRT unit, the control circuitry 750 may have the argument address calculation circuitry 860 generate values to store into one or more of the argument registers 731-734. Depending on the implementation, this the argument address calculation circuitry 760 may take some time to generate the values and have load them into one or more argument registers 731-734. The argument address calculation circuitry 760 may generate a second token 759 once the one or more argument registers 731-734 are loaded with the values calculated from the information 762 from the configuration file.

The control circuitry 750 may maybe configured to load the working registers 745 with values from the argument registers 731-734, as opposed to the CSRs 721-724, in response to the second token 759. Depending on the implementation, all or some of the argument registers 731-734 may be copied into the working registers 745. The control circuitry 750 can then begin to perform the command(s) s which were identified as described above. For example, the load/unload controller 700 may be configured to perform a first command in response to the second token and generate a third token upon completion of the first command, and then repeat to chain together 2 or more of an unload command, a load command, and an argument load command. New values may be calculated and loaded into one or more of the argument registers 731-734 by specific tokens or as a part of another command Thus, if an unload command is indicated, the control circuitry 750 has the address generation unit 740 generate a sequence of one or more addresses 749 starting at the address stored in the ULAA register 732 to store configuration information from the CGR array into memory similarly as described earlier (albeit with using a starting address from a different source). If a configuration load command is indicated, the control circuitry 750 has the address generation unit 740 generate a sequence of one or more addresses 749 starting at the address stored in the CLAA register 731 to read a configuration file from memory and load it into the CGR array similarly as described earlier (albeit with using a starting address from a different source). If an argument load command is indicated, the control circuitry 750 has the address generation unit 740 generate a sequence of one or more addresses 749 starting at the address stored in the ALAA register 733 to read an argument load file having a size as indicated by the ALSA register 734 from memory and load it into the CGR array similarly as described earlier (albeit with using a starting address from a different source).

In some implementations, the addresses stored in the CLA CSR, the ULA CSR, the ALA CSR, the CLAA register, the ULAA register, and the ALAA register may all be physical addresses and the address generation unit 740 may work in physical address space. In other implementations, the addresses stored in the CLA CSR, the ULA CSR, the ALA CSR, the CLAA register, the ULAA register, and the ALAA register may all be virtual addresses and the address generation unit 740 may perform a translation of the virtual addresses to physical addresses. In at least one implementation, the information 762 from the configuration file may be used to calculate virtual addresses which are translated to physical addresses by the argument address calculation circuitry 760 to be stored into the CLAA register, the ULAA register, and/or the ALAA register.

In a system as shown in FIG. 1, where the CGR processor 110 has a CGR array 120 consistent with the CGR array 400 shown in FIG. 4 using CGR units consistent with that shown the configurable unit 500 shown in FIG. 5 and having an MAGCU 410 with a load/unload controller 412 consistent with the load/unload controller 700 shown in FIG. 7, certain implementations may be described using reference to elements of any of FIG. 1, FIG. 4, FIG. 5, and/or FIG. 7. An example reconfigurable dataflow processor, which may be a CGR processor 110, includes an array of configurable units 120 connected to a bus system, such as the ALN which includes interconnects 420, 421, 422 and switches 403. The example reconfigurable dataflow processor 110 also includes a configuration load/unload controller 700, which may be a part of an MAGCU 410 connected to the bus system (ALN) and is coupled to a memory 190. The MAGCU 410 may be coupled to the memory 190 through a TLN 130 and a memory interface 139. The configuration load/unload controller 700 may include one or more of a configuration load controller, an unload controller, or an argument load controller, or may have functionality that combines one or more of those controllers into unified control circuitry 750.

The configuration load/unload controller 700 includes a first set of registers (e.g., CSR registers 721-724) to hold a first set of addresses (which may be a single address or multiple addresses) in the memory 190 to access a first configuration file 191A generated for a first level of a computation graph. The configuration load/unload controller 700 may also include a second set of registers (argument registers 731-734) to hold a next set of addresses (which may be a single address or multiple addresses) in the memory 190 to access a second configuration file 191B generated for a next level of the computation graph. In addition, the configuration load/unload controller 700 includes at least one address generation unit 740 including a working address register 745 to generate a sequence of addresses 749 starting an address stored in the working address register 745, and circuitry (program control CSR 710 and control circuitry 750) to receive a request from runtime software 170 running on a host 180 to load the first configuration file 191A by copying an address of the first set of addresses from a register 721 of the first set of registers 721-724 to the working address register 745 and start the at least one address generation unit 740 to generate a first sequence of addresses 749 to read the first configuration file 191A from the memory 190 and load it into the reconfigurable dataflow processor 110. The first configuration file 191A includes information used to generate a second set of addresses, including an address of the second configuration file 191B, that are loaded into the second set of registers 731-734. The configuration load/unload controller 700 also includes circuitry (program control CSR 710 and control circuitry 750) to receive a request from the runtime software 170 running on the host 180 to initiate execution of a currently loaded configuration file.

Circuitry (token 759 and control circuitry 750) is also included in the configuration load/unload controller 700 to detect completion of execution of the currently loaded configuration file and initiate loading of the second configuration file 191B, without involvement of the runtime software 170 running on the host 180. The configuration load/unload controller 700 may do this by copying an address of the second set of addresses from a register 731 of the second set of registers 731-734 to the working address register 745 and start the at least one address generation unit 740 to generate a second sequence of addresses 749 to read the second configuration file 191B from the memory 790 and load it into the reconfigurable dataflow processor 110. The second configuration file 191B includes information used to generate a third set of addresses that are loaded into the second set of registers 731-734. The third set of addresses indicate a storage location of a third configuration file 191C in memory 190.

FIG. 8 is a block diagram of a compiler stack 800 implementation suitable for generating a configuration file for a CGR processor. As depicted, compiler stack 800 includes several stages to convert a high-level program with statements that define user algorithms and functions, e.g., algebraic expressions and functions, to configuration data for the CGR units.

Compiler stack 800 may take its input from application platform 810, or any other source of high-level program statements suitable for parallel processing, which provides a user interface for general users. It may further receive hardware description 815, for example defining the physical units in a reconfigurable dataflow processor or CGRA processor. Application platform 810 may include libraries such as PyTorch, TensorFlow, ONNX, Caffe, and Keras to provide user-selected and configured algorithms.

Application platform 810 outputs a high-level program to compiler 820, which in turn outputs configuration files for execution by the reconfigurable dataflow processor or CGRA processor where it is executed in runtime processes 830. Compiler 820 may include dataflow graph compiler 821, which may handle a dataflow graph, algebraic graph compiler 822, template graph compiler 823, template library 824, and placer and router PNR 825. In some implementations, template library 824 includes RDU abstract intermediate language (RAIL) and/or assembly language interfaces for power users.

Dataflow graph compiler 821 converts the high-level program with user algorithms and functions from application platform 810 to one or more dataflow graphs. The application platform may be broken into multiple levels, or sections, that can individually fit into the target hardware platform. The high-level program may be suitable for parallel processing, and therefore parts of the nodes of the dataflow graphs may be intrinsically parallel unless an edge in the graph indicates a dependency. Dataflow graph compiler 821 may provide code optimization steps like false data dependency elimination, dead-code elimination, and constant folding. The dataflow graphs encode the data and control dependencies of the high-level program. Dataflow graph compiler 821 may support programming a reconfigurable dataflow processor at higher or lower-level programming languages, for example from an application platform 810 to C++ and assembly language. In some implementations, dataflow graph compiler 821 allows programmers to provide code that runs directly on the reconfigurable dataflow processor. In other implementations, dataflow graph compiler 821 provides one or more libraries that include predefined functions like linear algebra operations, element-wise tensor operations, non-linearities, and reductions required for creating, executing, and profiling the dataflow graphs on the reconfigurable processors. Dataflow graph compiler 821 may provide an application programming interface (API) to enhance functionality available via the application platform 810.

Algebraic graph compiler 822 may include a model analyzer and compiler (MAC) level that makes high-level mapping decisions for (sub-graphs of the) dataflow graph based on hardware constraints. It may support various application frontends such as Samba, JAX, and TensorFlow/HLO. Algebraic graph compiler 822 may also transform the graphs via autodiff and GradNorm, perform stitching between sub-graphs, interface with template generators for performance and latency estimation, convert dataflow graph operations to AIR operation, perform tiling, sharding (database partitioning) and other operations, and model or estimate the parallelism that can be achieved on the dataflow graphs.

Algebraic graph compiler 822 may further include an arithmetic or algebraic intermediate representation (AIR) level that translates high-level graph and mapping decisions provided by the MAC level into explicit AIR/Tensor statements and one or more corresponding algebraic graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Template graph compiler 823 may translate AIR statements and/or graphs into TLIR statements and/or graphs, optimizing for the target hardware architecture into unplaced variable-sized units (referred to as logical CGR units) suitable for place and route (PNR) 825. Template graph compiler 823 may add further information (name, inputs, input names and dataflow description) for PNR 825 and make the graph physically realizable through each performed step. Template graph compiler 823 may for example provide translation of AIR graphs to specific model operation templates such as for general matrix multiplication (GeMM). An implementation may convert part or all intermediate representation operations to templates, stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 824 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation.

PNR 825 translates and maps logical (i.e., unplaced physically realizable) CGR units to a physical layout on the physical level, e.g., a physical array of CGR units in a semiconductor chip. PNR 825 also determines physical data channels to enable communication among the CGR units and between the CGR units and circuits coupled via the TLN; allocates ports on the CGR units and switches; provides configuration data and initialization data for the target hardware; and produces configuration files, e.g., processor-executable format (PEF) files. It may further provide bandwidth calculations, allocate network interfaces such as AGCUs and virtual address generators (VAGs), provide configuration data that allows AGCUs and/or VAGs to perform address translation, and control ALN switches and data routing. PNR 825 may provide its functionality in multiple steps and may include multiple modules (not shown in FIG. 8) to provide the multiple steps, e.g., a placer, a router, a port allocator, and a PEF file generator. PNR 825 may receive its input data in various ways. For example, it may receive parts of its input data from any of the earlier modules (dataflow graph compiler 821, algebraic graph compiler 822, template graph compiler 823, and/or template library 824). In some implementations, an earlier module, such as template graph compiler 823, may have the task of preparing all information for PNR 825 and no other units provide PNR input data directly.

Further implementations of compiler 820 provide for an iterative process, for example by feeding information from PNR 825 back to an earlier module, so that the earlier module can execute a new compilation step in which it uses physically realized results rather than estimates of or placeholders for physically realizable circuits. For example, PNR 825 may feed information regarding the physically realized circuits back to algebraic graph compiler 822.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 820 binds memory allocations to unplaced memory units and binds operations specified by operation nodes in the dataflow graph to unplaced compute units, and these bindings may be specified in the configuration data. Compiler 820 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth and minimizing latency.

Figure 9:
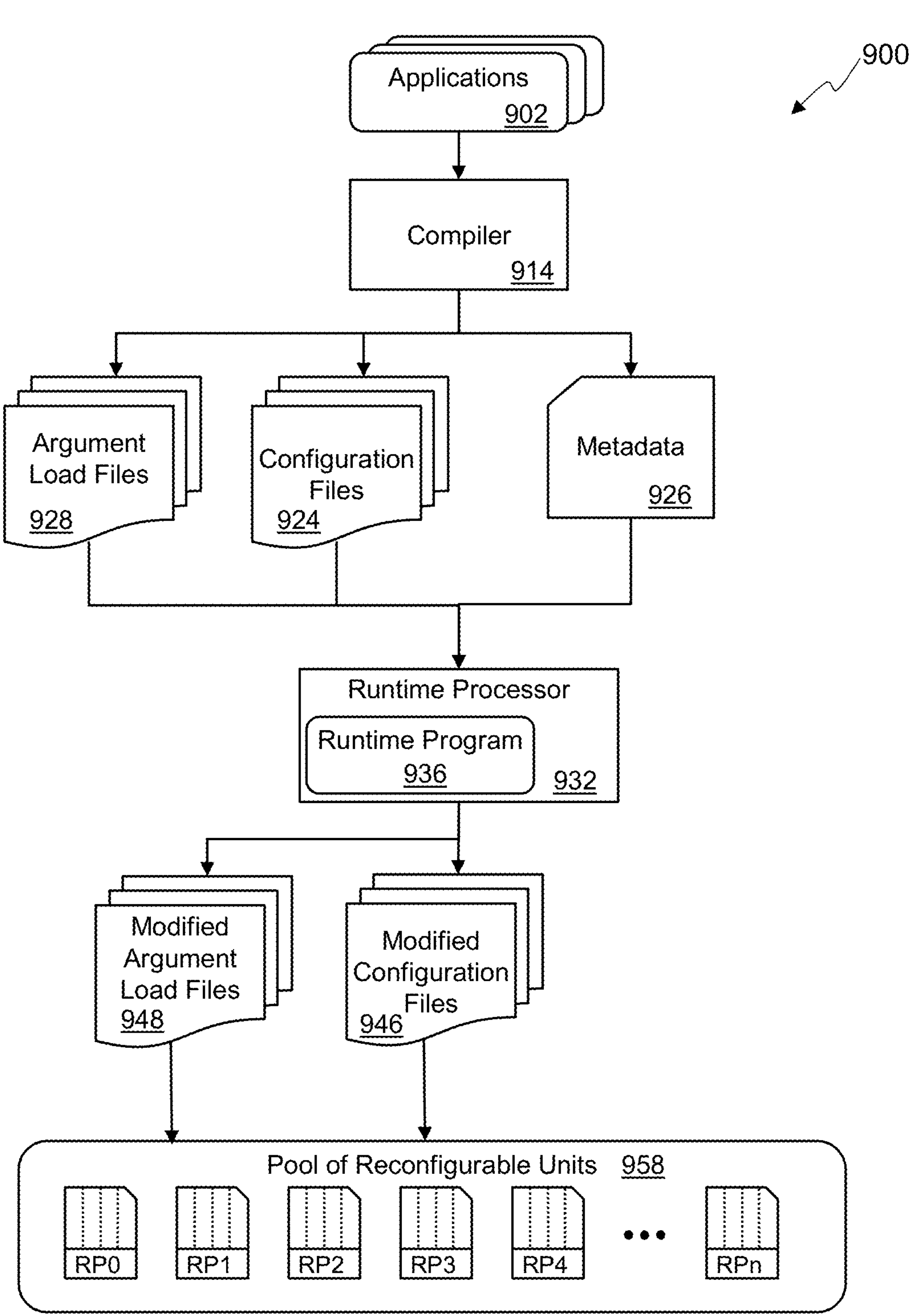
FIG. 9 shows an example of preparing configuration files and argument load files for loading into a CGR processor system.

FIG. 9 shows an example 900 of preparing configuration files and argument load files for loading into a CGR processor. Reconfigurable dataflow resources in a pool of reconfigurable dataflow resources 958 include reconfigurable processors as shown in FIGS. 1-7. A reconfigurable processor includes an array of configurable units (e.g., compute units and memory units) in a programmable interconnect fabric. The array of configurable units in a reconfigurable processor is partitionable into a plurality of subarrays (or tiles) of configurable units.

The pool of reconfigurable dataflow resources 958 also includes bus resources (or transfer resources). Examples of the bus resources include interconnect channels (e.g., PCIe or Ethernet), DMA channels, and memory channels (e.g., DDR or HBM). The pool of reconfigurable dataflow resources 958 also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of memory resources include latches, registers, and caches (e.g., SRAM). The pool of reconfigurable dataflow resources 958 is dynamically scalable to meet the performance objectives required by applications 902 (or user applications 902). The applications 902 may access the pool of reconfigurable dataflow resources 958 over one or more networks (e.g., Internet).

In some implementations, different compute scales and hierarchies form the pool of reconfigurable dataflow resources 958 according to different implementations of the technology disclosed. In one example, the pool of reconfigurable dataflow resources 958 is a node (or a single machine) that runs a plurality of reconfigurable processors, supported by required bus and memory resources. The node also includes a host processor (e.g., CPU) that exchanges data with the plurality of reconfigurable processors, for example, over a PCIe or Ethernet interface. The host processor includes a runtime processor that manages resource allocation, memory mapping, and execution of the configuration files for applications requesting execution from the host processor. In another example, the pool of reconfigurable dataflow resources 958 is a rack (or cluster) of nodes, such that each node in the rack runs a respective plurality of reconfigurable processors and includes a respective host processor configured with a respective runtime processor. The runtime processors are distributed across the nodes and communicate with each other so that they have unified access to the reconfigurable processors attached not only to their own node on which they run, but also to the reconfigurable processors attached to every other node in the data center.

The nodes in the rack are connected, for example, over Ethernet or InfiniBand (IB). In yet another example, the pool of reconfigurable dataflow resources 958 is a pod that comprises a plurality of racks. In yet another example, the pool of reconfigurable dataflow resources 958 is a superpod that comprises a plurality of pods. In yet another example, the pool of reconfigurable dataflow resources 958 is a zone that comprises a plurality of superpods. In yet another example, the pool of reconfigurable dataflow resources 958 is a data center that comprises a plurality of zones.

The applications 902 are executed on the reconfigurable processors in a distributed fashion by programming the individual compute and memory components to asynchronously receive, process, and send data and control information. In the reconfigurable processors, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 902 can include high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG Net, GoogleNet, ResNet, ResNext, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the innermost loop body, which can be exploited using loop unrolling, SIMD vectorization, and pipelining.

In some implementations, a software development kit (SDK) generates computation graphs (e.g., dataflow graphs, control graphs) of the high-level programs of the applications 902. The SDK transforms the input behavioral description of the high-level programs into an intermediate representation such as the computation graphs. This may include code optimization steps like false data dependency elimination, dead-code elimination, and constant folding. The computation graphs encode the data and control dependencies of the high-level programs.

The computation graphs comprise nodes and edges. The nodes can represent compute operations and memory allocations. The edges can represent dataflow and control flow. In some implementations, each loop in the high-level programs can be represented as a "controller" in the computation graphs. The computation graphs support branches, loops, function calls, and other variations of control dependencies. In some implementations, after the computation graphs are generated, additional analyses or optimizations focused on loop transformations can be performed, such as loop unrolling, loop pipelining, loop fission/fusion, and loop tiling.

The SDK also supports programming the reconfigurable processors in the pool of reconfigurable dataflow resources 958 at multiple levels, for example, from the high-level deep learning frameworks to C++ and assembly language. In some implementations, the SDK allows programmers to develop code that runs directly on the reconfigurable processors. In other implementations, the SDK provides libraries that contain predefined functions like linear algebra operations, element-wise tensor operations, non-linearities, and reductions required for creating, executing, and profiling the computation graphs on the reconfigurable processors. The SDK communicates with the deep learning frameworks via APIs.

A compiler 914 transforms the computation graphs into a hardware-specific configuration, which is specified in a configuration file generated by the compiler 914. In one implementation, the compiler 914 partitions the computation graphs into layers, or sections, that are individually able to fit into the available pool of reconfigurable units 958. Each layer generates one or more configuration files 924. The compiler 914 may also generate argument load files 928 for the execution of the computation graphs that may change over various portions of the execution of the computation graph. Arguments may include such things as immediate values for computation, initial counter values, and the like. Depending on the context, the term "configuration file" may refer to either a configuration file, an argument load file, or both.

The compiler 914 translates the applications 902 developed with commonly used open-source packages such as Keras and PyTorch into reconfigurable processor specifications. The compiler 914 generates the configuration files 924 with configuration data for the placed positions and the routed data and control networks. The configuration data can include an initial value for the arguments as well. In one implementation, this includes assigning coordinates and communication resources of the physical memory and compute units by placing and routing units onto the array of the processor while maximizing bandwidth and minimizing latency.

The compiler 914 may generate metadata 926 that accompanies the configuration files 924 and specifies modifications to the configuration files 924. The modifications specified in the metadata 926 include updates to argument data (or arguments) in the configuration files 924. The argument data may be included in one or more argument load files 928. The argument data specifies execution parameters of the applications 902. In some implementations, the arguments are specified by the users. In one implementation, the modifications specified in the metadata 926 include updates to memory mapping data in the configuration files 924. The memory mapping data translates virtual addresses of virtual dataflow resources specified in the configuration files to physical addresses of the reconfigurable dataflow resources allocated to the virtual dataflow resources. In other implementations, the metadata 926 specify modifications/changes/alterations to any content or aspect of the configuration files 924.

A runtime processor 932, configured with runtime program (or runtime program) 936, uses the metadata 926 to modify the configuration files 924 to generate modified configuration files 946. In some implementations, the runtime program 936 may also or alternatively use the metadata 926 to modify the argument load files 928 to generate modified argument load files 928.

The runtime processor 932, configured with the runtime program 936, loads and executes the modified configuration files 946 on the arrays of configurable units in the pool of reconfigurable processors 958. The runtime processor 932, configured with the runtime program 936, can also load the modified argument load files 948 into the arrays of configurable units in the pool of reconfigurable processors 958.

The applications 902 can be any type of application, but may be an artificial neural network and it may be used for accelerated deep learning. A first example of accelerated deep learning is using a deep learning accelerator implemented in a CGRA to train a neural network. A second example of accelerated deep learning is using the deep learning accelerator to operate a trained neural network to perform inferences. A third example of accelerated deep learning is using the deep learning accelerator to train a neural network and subsequently perform inference with any one or more of the trained neural network, information from the trained neural network, and a variant of the same.

Examples of neural networks include fully connected neural networks (FCNNs), recurrent neural networks (RNNs), graph neural networks (GNNs), convolutional neural networks (CNNs), graph convolutional networks (GCNs), long short-term memory (LSTM) networks, autoencoders, deep belief networks, and generative adversarial networks (GANs).

An example of training a neural network is determining one or more weights associated with the neural network, such as by back-propagation in a deep learning accelerator. An example of making an inference is using a trained neural network to compute results by processing input data using the weights associated with the trained neural network. As used herein, the term 'weight' is an example of a 'parameter' as used in various forms of neural network processing. For example, some neural network learning is directed to determining parameters (e.g., through back-propagation) that are usable for performing neural network inferences.

A neural network processes data according to a dataflow graph comprising layers of neurons. Example layers of neurons include input layers, hidden layers, and output layers. Stimuli (e.g., input data) are received by an input layer of neurons and the computed results of the dataflow graph (e.g., output data) are provided by an output layer of neurons. Example hidden layers include rectified linear unit (ReLU) layers, fully connected layers, recurrent layers, graphical network layers, long short-term memory layers, convolutional layers, kernel layers, dropout layers, and pooling layers. A neural network may be conditionally and/or selectively trained. After being trained, a neural network may be conditionally and/or selectively used for inference.

Examples of ICs, or parts of ICs, that may be used as deep learning accelerators, are processors such as central processing unit (CPUs), CGR processor ICs, graphics processing units (GPUS), FPGAS, ASICs, application-specific instruction-set processor (ASIP), and digital signal processors (DSPs). The disclosed technology implements efficient distributed computing by allowing an array of accelerators (e.g., reconfigurable processors) attached to separate hosts to directly communicate with each other via buffers.

Figure 10:
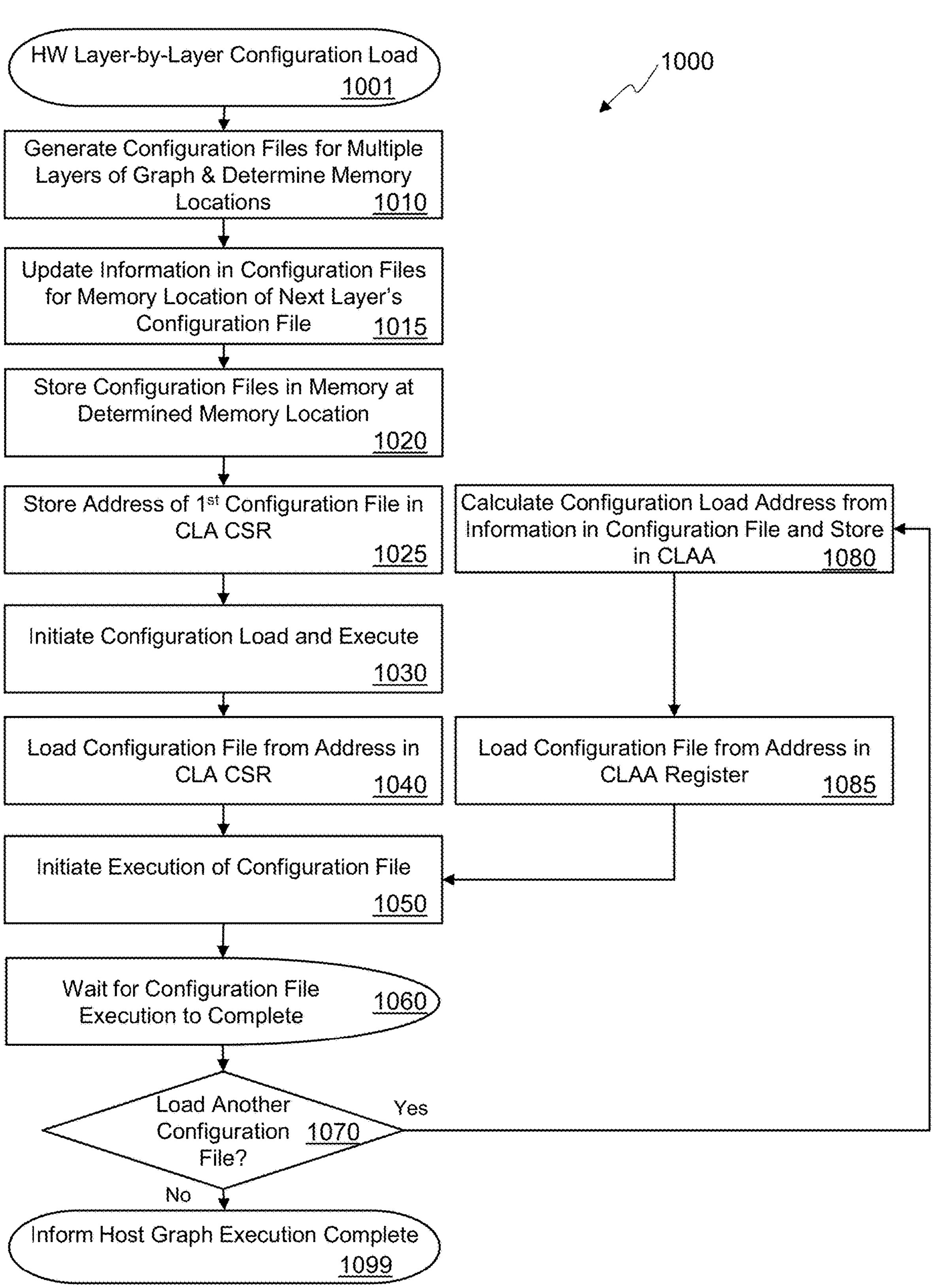
FIG. 10 is a flowchart of an example method of a hardware layer-by-layer configuration load.

FIG. 10 is a flowchart 1000 of an example method of a hardware layer-by-layer configuration load. The flowchart 1000 for the hardware layer-by-layer configuration load which allows for sequentially executing sections of a computation graph on a reconfigurable dataflow processor (RDP) begins 1001 by generating 1010 configuration files for multiple layers (or sections) of a graph and determining memory locations where those configuration files will be stored for access by the CGR processor(s). Some or all of the configuration files may include argument load files in some implementations. The configuration files may be generated using a compiler as previously described and the compiler or runtime may determine the memory locations.

A plurality of configuration files for different layers (or sections) of a computation graph are generated 1010. The plurality of configuration files includes a first configuration file for a first section and a second configuration file for a second section. It may also include a third configuration file for a third section. The first configuration file and the second configuration file may be of equal size. One or more of the configuration files in the plurality of configuration files may include one or more associated argument load files. Memory locations (or addresses) for the configuration files in the plurality of configuration files are determined. Memory at a first memory address may be allocated for a first configuration file. Memory at a second memory address may be allocated for a first argument load file. Memory at a third memory address may be allocated for a second configuration file. Memory at a fourth memory address may be allocated for a second argument load file. Memory at a fifth memory address may be allocated for a third configuration file. Memory at a sixth memory address may be allocated for a third argument load file. The configuration files (or their associated argument load files) are updated 1015 to include information used to calculate memory addresses of a next configuration file (and/or its associated argument load file) for a next section (or layer) of the computation graph. So, the first configuration file (or first argument load file) includes information used to calculate the third memory address for the second configuration file (and/or information used to calculate the fourth memory address for the second argument load file) and the second configuration file (or second argument load file) includes information used to calculate the fifth memory address for the third configuration file (and/or information used to calculate the sixth memory address for the third argument load file).

The plurality of configuration files are then stored 1020 into memory by a host computer. A plurality of associated argument load files, respectively associated with at least some of the plurality of configuration files, may also be stored into memory by the host computer. A first argument load file and a second argument load file of the plurality of associated argument load files may have different sizes. The first configuration file (or first argument load file) also may include information used to calculate the size of the second argument load file and the second configuration file (or second argument load file) may include information used to calculate the size of the third argument load file.

The host computer then stores 1025 a first memory address of the first configuration file into a CLA register of the RDP and initiates 1030 a configuration load process in the RDP. The host computer may also indicate to the RDP that the configuration file should be executed once it has been loaded if there is no associated argument load file. The configuration load circuitry of the RDP then loads 1040, using the first memory address from the CLA register, the first configuration file from the memory into a set of dataflow processing units of the RDP. This may include generating a first sequence of addresses starting at the first memory address to access the first configuration file in the memory, which may be done by copying the first memory address from the CLA register to a working register of an address generation unit and generating the first sequence of addresses using the address generation unit. If there is an associated first argument load file, the host computer may store the second memory address of the first argument load file into an ALA register of the RDP and store a first size of the first argument load file into an ALS register of the RDP and initiate an argument load operation. The configuration load circuitry then may load the first argument load file from the memory into the set of dataflow processing units using the second memory address from the ALA register and the size from the ALS register. This can be done after the first configuration file has been loaded into the set of dataflow processing units but before executing the first section of the computation graph. The host computer may also indicate to the RDP that the first configuration file should be executed once the first argument load file has been loaded into the RDP.

Once the first configuration file and/or the first argument load file have been loaded, the RDP initiates 1050 execution. This may be done automatically upon completion of loading the first configuration file and/or the first argument load file based on the command received from the host processor, or may be done explicitly by another command received from the host processor. The configuration load circuitry then waits 1060 for completion of execution the first section of the computation graph based on the first configuration file. Completion of execution of the first section of the computation graph may be accomplished by any suitable technique, but in at least some implementations, this may be accomplished by sending a first signal (e.g. a first token) from a dataflow processing unit (e.g., a CGR unit) in the set of dataflow processing units (e.g., an array of CGR units) to the configuration load circuitry upon completion of the execution of the first section.

A determination is made as to whether or not to load 1070 another configuration file. This may be done outside of the control of the configuration load circuitry by simply having a last section of the computation graph not generate the first signal to load another section of the computation graph. If the determination is made not to load another configuration file, implementations may use any mechanisms to inform 1099 the host computer that the graph execution is complete, including a flag in the program control CSR, a flag in another register or memory, or an interrupt sent to the host computer. In other cases, the first signal may still be received, but an argument register, such as the CLAA, ULAA, ALAA, or some other argument register, can be examined to determine if another configuration file or argument loaf file should be loaded.

If a next section of the graph is to be loaded and executed, the configuration load/unload controller is configured to respond to the first token indicating completion of execution. In one implementation, the load/unload controller is configured to calculate 1080 a third memory address of the second configuration file using information which is included in the first configuration file and is stored into a CLAA register of the RDP. If a first argument load file was loaded into the RDP, it may have updated the information used to generate the third memory address which is stored into the CLAA register. The fourth memory address and second size of a second argument load file, which are also calculated based on information included in the first configuration file and/or the first argument load file, may be stored into the ALAA register and ALSA register, respectively, of the RDP at the same time as the CLAA register is loaded. Once the CLAA, and in some cases, the ULAA, ALAA, and/or ALSA, are loaded with new values the load/unload controller may be configured to respond by performing one of an unload command, a load command, or an argument load command. The loading of the CLAA, ULAA, ALAA, and/or ALSA may generate a second token which may be used to trigger the command. Which command is to be triggered depends on the configuration of the load/unload controller which is set by its currently loaded configuration file.

If the load/unload controller is configured to respond to the second token with an unload operation, an unload operation may be performed, storing configuration values from the array of CGR units into a configuration file in memory at the address in the ULAA register. If the load/unload controller is configured to respond to the second token with a configuration load operation, a configuration load operation may be performed, loading 1085, by the configuration load circuitry in response to receiving the second token, the second configuration file from the memory into the set of dataflow processing units using an address from the CLAA register. This may include copying the third memory address from the CLAA register to the working register of the address generation unit and generating the second sequence of addresses using the address generation unit. If the load/unload controller is configured to respond to the second token with an argument load operation, an argument load operation may be performed, loading an argument load file having a size as defined in the ALSA register, into the set of dataflow processing units using the fourth address from the ALAA register. This may include generating a third sequence of addresses starting at the fourth memory address, stored in the ALAA register, to access the second argument load file in the memory and using, by the configuration load circuitry, the second size, from the ALSA register, to load the second argument load file from the memory into the set of dataflow processing units.

One, two, or all three of the unload, configuration load, or argument load operations may be performed with tokens generated by the completion of one operation triggering the next operation. In some implementations, completion of one operation may trigger updating of the ULAA, CLAA, ALAA, and/or ALSA registers based on the information in the currently loaded configuration and completion of generation of the new values and storing them in the argument register(s) may generate another token which can trigger a new operation. Once the specified operations have been performed, the second section of the computation graph is executed 1050 by the set of dataflow processing units based on the second configuration file. The flowchart 1000 shows that this process repeats, through steps 1060, 1070, 1080, 1085, until there are no more configuration files to load for additional sections of the computation graph. Then the host may be informed that the execution of the computation of the graph has completed 1099.

PARTICULAR IMPLEMENTATIONS

Example 1. A reconfigurable dataflow processor, comprising: a bus system; an array of configurable units connected to the bus system; a configuration load controller connected to the bus system and coupled to a memory, the configuration load controller comprising: a first set of registers to hold a first set of addresses in the memory to access a first configuration file generated for a first level of a computation graph; a second set of registers to hold a next set of addresses in the memory to access a second configuration file generated for a next level of the computation graph; at least one address generation unit including a working address register to generate a sequence of addresses starting an address stored in the working address register; circuitry to receive a request from runtime software running on a host to load the first configuration file by copying an address of the first set of addresses from a register of the first set of registers to the working address register and start the at least one address generation unit to generate a first sequence of addresses to read the first configuration file from the memory and load it into the reconfigurable dataflow processor, the first configuration file including first information used to calculate a second set of addresses that are loaded into the second set of registers; circuitry to receive a request from the runtime software running on the host to initiate execution of a currently loaded configuration file; and circuitry to detect completion of execution of the currently loaded configuration file and initiate loading of the second configuration file, without involvement of the runtime software running on the host, by copying an address of the second set of addresses from a register of the second set of registers to the working address register and start the at least one address generation unit to generate a second sequence of addresses to read the second configuration file from the memory and load it into the reconfigurable dataflow processor, the second configuration file including second information used to calculate a third set of addresses that are loaded into the second set of registers, wherein the third set of addresses indicate a storage location of a third configuration file.

Example 2. A reconfigurable dataflow processor comprising: a set of dataflow processing units: a CLA register to hold a first memory address; a CLAA register to hold a third memory address; and configuration load circuitry coupled to the set of dataflow processing units and a memory to load a first configuration file from the first memory address in the memory into the set of dataflow processing units in response to a first signal, and to load a second configuration file from the third memory address in the memory into the set of dataflow processing units in response to a second signal.

Example 3. The reconfigurable dataflow processor of example 2, further comprising: an address generation unit to generate a first sequence of addresses starting at the first memory address to access the first configuration file in the memory in response to the first signal, and to generate a second sequence of addresses starting at the third memory address to access the second configuration file in the memory in response to the second signal.

Example 4. The reconfigurable dataflow processor of example 3, wherein the address generation unit is included in the configuration load circuitry.

Example 5. The reconfigurable dataflow processor of example 3, wherein the address generation unit is included in a memory controller of the reconfigurable dataflow processor that is coupled to the memory.

Example 6. The reconfigurable dataflow processor of examples 3 or 4, the configuration load circuitry further comprising: a working register in the address generation unit; circuitry to copy the first memory address from the CLA register to the working register in response to the first signal; and circuitry to copy the third memory address from the CLAA register to the working register in response to the second signal.

Example 7. The reconfigurable dataflow processor of any of examples 3-6, wherein a first number of addresses included in the first sequence of addresses and a second number of addresses included the second sequence of addresses are equal and is a predetermined number based on a size of a configuration store in the set of dataflow processing units.

Example 8. The reconfigurable dataflow processor of any of examples 2-7, wherein the CLAA register is loaded with the third memory address, calculated based on first information included in the first configuration file, in response to completion of execution of the first configuration file by the set of dataflow processing units, and the second signal is generated upon completion of loading the CLAA register with the third memory address.

Example 9. The reconfigurable dataflow processor of example 8, wherein the CLAA register is loaded with a fifth memory address of a third configuration file in the memory, calculated based on second information included in the second configuration file, in response to completion of execution of the second configuration file by the set of dataflow processing units.

Example 10. The reconfigurable dataflow processor of any of examples 2-9, wherein the CLA register is accessible by a computer coupled to the reconfigurable dataflow processor.

Example 11. The reconfigurable dataflow processor of any of examples 2-10, further comprising: a control/status register (CSR); and circuitry to generate the first signal in response to an access of the CSR by a computer coupled to the reconfigurable dataflow processor.

Example 12. The reconfigurable dataflow processor of any of examples 2-11, further comprising circuitry in a dataflow processing unit in the set of dataflow processing units to generate a completion signal to indicate that a currently loaded configuration file has completed execution.

Example 13. The reconfigurable dataflow processor of any of examples 2-12, further comprising circuitry to initiate execution of a portion of a dataflow graph defined by the second configuration file in response to completion of the load of the second configuration file into the set of dataflow processing units by the configuration load circuitry.

Example 14. The reconfigurable dataflow processor of any of examples 2-14, further comprising: a ULA register to hold an unload memory address; and configuration unload circuitry coupled to the set of dataflow processing units and the memory to unload configuration information from the set of dataflow processing units and store the configuration information into the memory at the unload memory address.

Example 15. The reconfigurable dataflow processor of any of examples 2-14, further comprising: an ALAA register to hold a fourth memory address of a second argument load file; an ALSA register to hold a size of the second argument load file; and argument load circuitry coupled to the set of dataflow processing units and the memory to load the second argument load file of the size from the fourth memory address in the memory into the set of dataflow processing units in response to a third signal.

Example 16. The reconfigurable dataflow processor of example 15, further comprising an address generation unit to: generate a first sequence of addresses starting at the first memory address to access the first configuration file in the memory in response to the first signal; generate a second sequence of addresses starting at the third memory address to access the second configuration file in the memory in response to the second signal; and generate a third sequence of addresses starting at the fourth memory address with a number of addresses in the third sequence of addresses based on the size stored in the ALSA register in response to the third signal.

Example 17. The reconfigurable dataflow processor of example 15 or 16, wherein the third signal is generated by the configuration load circuitry in response to completion of the load of the second configuration file into the set of dataflow processing units by the configuration load circuitry.

Example 18. The reconfigurable dataflow processor of any of examples 15-17, further comprising circuitry to initiate execution of a portion of a dataflow graph defined by the second configuration file loaded into the set of dataflow processing units in response to completion of the load of the second argument load file into the set of dataflow processing units by the argument load circuitry, wherein the second argument load file is associated with the second configuration file.

Example 19. The reconfigurable dataflow processor of any of examples 15-18, wherein one or more of the CLAA register, the ALAA register, or the ALSA register are loaded with new values, based on updated second information included in the second argument load file, upon completion of execution of the second configuration file by the set of dataflow processing units.

Example 20. A system for sequentially loading configuration files into a reconfigurable dataflow processor (RDP) for executing sections of a computation graph, the system comprising: a host computer configured to pre-load a plurality of configuration files and associated argument load files for different sections of a computation graph into a memory, including a first configuration file and associated first argument load file and a second configuration file and associated second argument load file; and an RDP comprising: a set of dataflow processing units to execute the sections of the computation graph; at least one control/status register (CSR); configuration load circuitry configured to load a configuration file and associated argument load file of the plurality of configuration files and the associated argument load files from the memory into the set of dataflow processing units of the RDP; and a CLAA register and an ALAA register; wherein the host computer is further configured to store first memory addresses of the first configuration file and the associated first argument load file into the at least one CSR and initiate a configuration load process in the RDP; and wherein the configuration load circuitry is further configured to: load the first configuration file and associated first argument load file from the memory into the set of dataflow processing units and initiate execution of a first section of the computation graph by the set of dataflow processing units of the RDP based on the first configuration file and associated first argument load file in response to initiation of the configuration load and execute process by the host computer; upon completion of the execution of the first section of the computation graph, load a second address based on first information in the first configuration file into the CLAA and load the second configuration file from the memory into the set of dataflow processing units using the second address stored in the CLAA register; upon completion of loading the second configuration file into the set of dataflow processing units, load a third address based on second information in the second configuration file into the ALAA register and load the associated second argument load file from the memory into the set of dataflow processing units using the third address stored in the ALAA register; and upon completion of loading the associated second argument load file into the set of dataflow processing units, initiate execution of a second section of the computation graph by the set of dataflow processing units of the RDP based on the second configuration file and associated second argument load file.

Example 21. The system of example 20, wherein configuration files of the plurality of configuration files have a uniform predetermined size.

Example 22. The system of example 20 or 21, wherein argument load files of the plurality of configuration files and the associated argument load files vary in size.

Example 23. A method for sequentially loading and executing sections of a computation graph on a reconfigurable dataflow processor (RDP), the method comprising: storing a plurality of configuration files for different sections of a computation graph, including a first configuration file for a first section and a second configuration file for a second section, into memory by a host computer; storing, by the host computer, a first memory address of the first configuration file into a CLA register of the RDP; initiating, by the host computer, a configuration load process in the RDP; loading, by configuration load circuitry of the RDP using the first memory address, the first configuration file from the memory into a set of dataflow processing units of the RDP; executing, by the set of dataflow processing units, the first section of the computation graph based on the first configuration file; sending a first signal from a dataflow processing unit in the set of dataflow processing units to the configuration load circuitry upon completion of the execution of the first section; storing a third memory address, based on first information included in the first configuration file, into a CLAA register of the RDP in response to receiving the first signal; loading, by the configuration load circuitry, after the third memory address has been stored into the CLAA register, the second configuration file from the memory into the set of dataflow processing units using the third memory address from the CLAA register; and executing, by the set of dataflow processing units, the second section of the computation graph based on the second configuration file.

Example 24. The method of example 23, further comprising storing a fifth memory address of a third configuration file, calculated based on second information included in the second configuration file, into the CLAA register of the RDP.

Example 25. The method of example 24, further comprising: generating a first sequence of addresses starting at the first memory address to access the first configuration file in the memory; and generating a second sequence of addresses starting at the third memory address to access the second configuration file in the memory.

Example 26. The method of example 25, further comprising: copying the first memory address from the CLA register to a working register of an address generation unit and generating the first sequence of addresses starting at the first memory address using the address generation unit; and copying the third memory address from the CLAA register to the working register of the address generation unit and generating the second sequence of addresses starting at the third memory address using the address generation unit.

Example 27. The method of any of examples 23-26, wherein the first configuration file and the second configuration file are of equal size.

Example 28. The method of any of examples 23-27, wherein at least one configuration file of the plurality of configuration files includes an associated argument load file.

Example 29. The method of any of examples 23-28, further comprising: storing a plurality of associated argument load files, respectively associated with at least some of the plurality of configuration files, into memory by the host computer; and automatically loading, by the configuration load circuitry without intervention by the host computer after its respective configuration file has been loaded into the set of dataflow processing units but before executing the respective configuration file, an associated argument load file into the set of dataflow processing units.

Example 30. The method of example 29, wherein a first argument load file and a second argument load file of the plurality of associated argument load files have different sizes.

Example 31. The method of any of examples 23-30, further comprising: storing a first argument load file, associated with the first configuration file, into the memory by the host computer; storing, by the host computer, a second memory address of the first argument load file into an ALA register of the RDP; and loading, by the configuration load circuitry after the first configuration file has been loaded into the set of dataflow processing units but before executing the first section of the computation graph, the first argument load file from the third memory address of the memory into the set of dataflow processing units.

Example 32. The method of example 31, further comprising: storing, by the host computer, a first size of the first argument load file into an ALS register of the RDP; and using, by the configuration load circuitry, the first size to load the first argument load file from the memory into the set of dataflow processing units.

Example 33. The method of example 31 or 32, further comprising storing, by the configuration load circuitry, an updated third memory address of the second configuration file into the CLAA register of the RDP, wherein the updated second memory address is based on updated first information included in the first argument load file.

Example 34. The method of example 33, further comprising storing, by the configuration load circuitry, a fourth memory address and second size of a second argument load file into an ALAA register and ALSA register, respectively, of the RDP, wherein the fourth memory address and the second size are based on the first information included in the first argument load file.

Example 35. The method of any of examples 23-34, further comprising storing an updated third memory address of the second configuration file, calculated based on updated first information included in a first argument load file into the CLAA register, of the RDP.

Example 36. The method of any of examples 23-35, further comprising: storing a second argument load file, associated with the second configuration file, into the memory by the host computer; storing, by the configuration load circuitry, a fourth memory address of the second argument load file into an ALAA register of the RDP, wherein the fourth memory address is based on the first information included in the first configuration file or updated first information included in a first argument load file; and loading, by the configuration load circuitry without intervention by the host computer after the second configuration file has been loaded into the set of dataflow processing units but before executing the second section of the computation graph, the second argument load file from the fourth memory address of the memory into the set of dataflow processing units.

Example 37. The method of example 36, further comprising: storing, by the configuration load circuitry, a second size of the second argument load file into an ALSA register of the RDP, wherein the second size is based on the first information included in the first configuration file or the updated first information included in the first argument load file; and using, by the configuration load circuitry, the second size to load the second argument load file from the memory into the set of dataflow processing units.

CONSIDERATIONS

We describe various implementations of a hardware layer-by-layer control in a reconfigurable dataflow processor.

The technology disclosed can be practiced as a system, apparatus, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the implementations described herein.

Although the description has been described with respect to particular implementations thereof, these particular implementations are merely illustrative, and not restrictive. The description may reference specific structural implementations and methods, and does not intend to limit the technology to the specifically disclosed implementations and methods. The technology may be practiced using other features, elements, methods and implementations. Implementations are described to illustrate the present technology, not to limit its scope, which is defined by the claims. Those of ordinary skill in the art recognize a variety of equivalent variations on the description above.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to specific implementations thereof, these specific implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, a coarse-grained reconfigurable architecture (CGRA), or in a programmable logic device such as a field-programmable gate array (FPGA), obviating the need for at least part of any dedicated hardware. Implementations may be as a single chip, or as a multi-chip module (MCM) packaging multiple semiconductor dies in a single package. All such variations and modifications are to be considered within the ambit of the disclosed technology the nature of which is to be determined from the foregoing description.

Any suitable technology for manufacturing electronic devices can be used to implement the circuits of specific implementations, including CMOS, FinFET, GAAFET, BICMOS, bipolar, JFET, MOS, NMOS, PMOS, HBT, MESFET, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different specific implementations. In some specific implementations, multiple elements, devices, or circuits shown as sequential in this specification can be operating in parallel.

Any suitable programming language can be used to implement the routines of specific implementations including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different specific implementations. In some specific implementations, multiple steps shown as sequential in this specification can be performed at the same time.

Specific implementations may be implemented in a tangible, non-transitory computer-readable storage medium for use by or in connection with the instruction execution system, apparatus, board, or device. Specific implementations can be implemented in the form of control logic in software or hardware or a combination of both. The control logic, when executed by one or more processors, may be operable to perform that which is described in specific implementations. For example, a tangible non-transitory medium such as a hardware storage device can be used to store the control logic, which can include executable instructions.

One or more implementations of the technology or elements thereof can be implemented in the form of a computer product, including a non-transitory computer-readable storage medium with computer usable program code for performing any indicated method steps and/or any configuration file for one or more CGR processors to execute a high-level program. Furthermore, one or more implementations of the technology or elements thereof can be implemented in the form of an apparatus including a memory and at least one processor that is coupled to the memory and operative to perform exemplary method steps, and/or a CGR processor that is operative to execute a high-level program based on a configuration file. Yet further, in another aspect, one or more implementations of the technology or elements thereof can be implemented in the form of means for carrying out one or more of the method steps described herein and/or executing a high-level program described herein. Such means can include (i) hardware module(s); (ii) software module(s) executing on one or more hardware processors; (iii) bit files for configuration of a CGR array; or (iv) a combination of aforementioned items.

It will also be appreciated that one or more of the elements depicted in the drawings/figures can also be implemented in a more separated or integrated manner, or even removed or rendered as inoperable in certain cases, as is useful in accordance with a particular application.

Thus, while specific implementations have been described herein, latitudes of modification, various changes, and substitutions are intended in the foregoing disclosures, and it will be appreciated that in some instances some features of specific implementations will be employed without a corresponding use of other features without departing from the scope as set forth. Therefore, many modifications may be made to adapt a particular situation or material to the essential scope of this disclosure.

The invention claimed is:

1. A system for sequentially loading configuration files into a reconfigurable dataflow processor (RDP) for executing sections of a computation graph, the system comprising:

a host computer configured to pre-load a plurality of configuration files and associated argument load files for different sections of a computation graph into a memory, including a first configuration file and associated first argument load file and a second configuration file and associated second argument load file; and an RDP comprising:

a set of dataflow processing units to execute the sections of the computation graph;

at least one control/status register (CSR);

configuration load circuitry configured to load a configuration file and associated argument load file of the plurality of configuration files and the associated argument load files from the memory into the set of dataflow processing units of the RDP; and a CLAA register and an ALAA register;

wherein the host computer is further configured to store first memory addresses of the first configuration file and the associated first argument load file into the at least one CSR and initiate a configuration load and execute process in the RDP; and wherein the configuration load circuitry is further configured to:

load the first configuration file and associated first argument load file from the memory into the set of dataflow processing units and initiate execution of a first section of the computation graph by the set of dataflow processing units of the RDP based on the first configuration file and associated first argument load file;

upon completion of the execution of the first section of the computation graph, load a second address based on first information in the first configuration file into the CLAA register and load the second configuration file from the memory into the set of dataflow processing units using the second address stored in the CLAA register;

upon completion of loading the second configuration file into the set of dataflow processing units, load a third address based on second information in the second configuration file into the ALAA register and load the associated second argument load file from the memory into the set of dataflow processing units using the third address stored in the ALAA register; and upon completion of loading the associated second argument load file into the set of dataflow processing units, initiate execution of a second section of the computation graph by the set of dataflow processing units of the RDP based on the second configuration file and associated second argument load file.

2. A reconfigurable dataflow processor comprising:

a set of dataflow processing units:

a CLA register to hold a first memory address;

a CLAA register to hold a third memory address; and configuration load circuitry coupled to the set of dataflow processing units and a memory to load a first configuration file from the first memory address in the memory into the set of dataflow processing units in response to a first signal, and to load a second configuration file from the third memory address in the memory into the set of dataflow processing units in response to a second signal;

wherein the first configuration file is executed by the set of dataflow processing units;

the CLAA register is loaded with the third memory address, calculated based on first information included in the first configuration file, in response to completion of execution of the first configuration file by the set of dataflow processing units;

the second signal is generated upon completion of loading the CLAA register with the third memory address; and the second configuration file is executed by the set of dataflow processing units.

3. The reconfigurable dataflow processor of claim 2, the configuration load circuitry further comprising:

an address generation unit to generate a first sequence of addresses starting at the first memory address to access the first configuration file in the memory in response to the first signal, and to generate a second sequence of addresses starting at the third memory address to access the second configuration file in the memory in response to the second signal;

a working register in the address generation unit;

circuitry to copy the first memory address from the CLA register to the working register in response to the first signal; and circuitry to copy the third memory address from the CLAA register to the working register in response to the second signal.

4. The reconfigurable dataflow processor of claim 2, wherein the CLA register is accessible by a computer coupled to the reconfigurable dataflow processor.

5. The reconfigurable dataflow processor of claim 2, further comprising:

a control/status register (CSR); and circuitry to generate the first signal in response to an access of the CSR by a computer coupled to the reconfigurable dataflow processor.

6. The reconfigurable dataflow processor of claim 2, further comprising circuitry in a dataflow processing unit in the set of dataflow processing units to generate a completion signal to indicate that a currently loaded configuration file has completed execution.

7. The reconfigurable dataflow processor of claim 2, further comprising circuitry to initiate execution of a portion of a dataflow graph defined by the second configuration file in response to completion of the load of the second configuration file into the set of dataflow processing units by the configuration load circuitry.

8. The reconfigurable dataflow processor of claim 2, further comprising:

a ULA register to hold an unload memory address; and configuration unload circuitry coupled to the set of dataflow processing units and the memory to unload configuration information from the set of dataflow processing units and store the configuration information into the memory at the unload memory address.

9. The reconfigurable dataflow processor of claim 2, further comprising:

an ALAA register to hold a fourth memory address of a second argument load file;

an ALSA register to hold a size of the second argument load file; and argument load circuitry coupled to the set of dataflow processing units and the memory to load the second argument load file of the size from the fourth memory address in the memory into the set of dataflow processing units in response to a third signal.

10. The reconfigurable dataflow processor of claim 9, further comprising an address generation unit to:

generate a first sequence of addresses starting at the first memory address to access the first configuration file in the memory in response to the first signal;

generate a second sequence of addresses starting at the third memory address to access the second configuration file in the memory in response to the second signal; and generate a third sequence of addresses starting at the fourth memory address with a number of addresses in the third sequence of addresses based on the size stored in the ALSA register in response to the third signal.

11. The reconfigurable dataflow processor of claim 9, wherein one or more of the CLAA register, the ALAA register, or the ALSA register are loaded with new values, based on updated second information included in the second argument load file, upon completion of execution of the second configuration file by into the set of dataflow processing units.

12. A method for sequentially loading and executing sections of a computation graph on a reconfigurable dataflow processor (RDP), the method comprising:

storing a plurality of configuration files for different sections of a computation graph, including a first configuration file for a first section and a second configuration file for a second section, into memory by a host computer;

storing, by the host computer, a first memory address of the first configuration file into a CLA register of the RDP;

initiating, by the host computer, a configuration load process in the RDP;

loading, by configuration load circuitry of the RDP using the first memory address, the first configuration file from the memory into a set of dataflow processing units of the RDP;

executing, by the set of dataflow processing units, the first section of the computation graph based on the first configuration file;

sending a first signal from a dataflow processing unit in the set of dataflow processing units to the configuration load circuitry upon completion of the execution of the first section;

storing a third memory address, based on first information included in the first configuration file, into a CLAA register of the RDP in response to receiving the first signal;

loading, by the configuration load circuitry, after the third memory address has been stored into the CLAA register, the second configuration file from the memory into the set of dataflow processing units using the third memory address from the CLAA register; and executing, by the set of dataflow processing units, the second section of the computation graph based on the second configuration file.

13. The method of claim 12, wherein at least one configuration file of the plurality of configuration files includes an associated argument load file.

14. The method of claim 12, further comprising:

storing a plurality of associated argument load files, respectively associated with at least some of the plurality of configuration files, into memory by the host computer; and automatically loading, by the configuration load circuitry without intervention by the host computer after its respective configuration file has been loaded into the set of dataflow processing units but before executing the respective configuration file, an associated argument load file into the set of dataflow processing units.

15. The method of claim 12, further comprising:

storing a first argument load file, associated with the first configuration file, into the memory by the host computer;

storing, by the host computer, a second memory address of the first argument load file into an ALA register of the RDP; and loading, by the configuration load circuitry after the first configuration file has been loaded into the set of dataflow processing units but before executing the first section of the computation graph, the first argument load file from the third memory address of the memory into the set of dataflow processing units.

16. The method of claim 15, further comprising:

storing, by the host computer, a first size of the first argument load file into an ALS register of the RDP; and using, by the configuration load circuitry, the first size to load the first argument load file from the memory into the set of dataflow processing units.

17. The method of claim 15, further comprising storing, by the configuration load circuitry, an updated third memory address of the second configuration file into the CLAA register of the RDP, wherein the updated third memory address is based on updated first information included in the first argument load file.

18. The method of claim 12, further comprising storing an updated third memory address of the second configuration file, calculated based on updated first information included in a first argument load file, into the CLAA register of the RDP.

19. The method of claim 12, further comprising:

storing a second argument load file, associated with the second configuration file, into the memory by the host computer;

storing, by the configuration load circuitry, a fourth memory address of the second argument load file into an ALAA register of the RDP and a second size of the second argument load file into an ALSA register of the RDP, wherein the fourth memory address and the second size are based on the first information included in the first configuration file or updated first information included in a first argument load file; and loading, by the configuration load circuitry without intervention by the host computer after the second configuration file has been loaded into the set of dataflow processing units but before executing the second section of the computation graph, the second argument load file from the fourth memory address of the memory using the second size into the set of dataflow processing units.

* * * * *